United States Patent [19]

Hattori et al.

[11] Patent Number: 5,211,083

[45] Date of Patent: May 18, 1993

[54] HYDRAULIC CONTROL APPARATUS FOR POWER TRANSMITTING SYSTEM INCLUDING BELT-AND-PULLEY TYPE CONTINUOUSLY VARIABLE TRANSMISSION AND TORQUE CONVERTER EQUIPPED WITH LOCK-UP CLUTCH

[75] Inventors: Yuji Hattori; Yoshinobu Soga; Masami Sugaya; Nobuyuki Kato, all of Susono, Japan

[73] Assignee: Toyota Jidosha Kabushiki Kaisha, Toyota, Japan

[21] Appl. No.: 809,164

[22] Filed: Dec. 18, 1991

[30] Foreign Application Priority Data

Dec. 28, 1990 [JP] Japan .................. 2-416145

[51] Int. Cl.$^5$ .................. B60K 41/14; F16H 61/14
[52] U.S. Cl. .................. 74/890; 74/731.1; 192/0.076; 192/3.3; 192/3.31; 474/18; 474/28
[58] Field of Search .................. 74/730.1, 731.1, 732.1, 74/733.1, 890; 192/0.073, 0.076, 0.092, 3.3, 3.31, 3.58; 474/18, 28, 69

[56] References Cited

U.S. PATENT DOCUMENTS

| | | |
|---|---|---|
| 3,640,151 | 2/1972 | Sumiyoshi et al. |
| 3,701,294 | 10/1972 | Ito et al. |
| 4,004,417 | 1/1977 | Woody et al. ............... 74/733.1 X |
| 4,274,520 | 6/1981 | Van der Hardt Aberson ... 74/732.1 X |
| 4,468,988 | 9/1984 | Hiramatsu .................. 74/890 X |
| 4,478,105 | 10/1984 | Yamamuro et al. .................. 74/731.1 |
| 4,660,697 | 4/1987 | Yoneda et al. .................. 74/890 X |
| 4,665,773 | 5/1987 | Hiramatsu et al. .................. 172/0.076 X |
| 4,720,003 | 1/1988 | Murasugi .................. 192/3.3 X |
| 4,747,808 | 5/1988 | Moan .................. 474/18 X |
| 4,843,918 | 7/1989 | Morimoto .................. 192/3.31 X |
| 4,846,765 | 7/1989 | Sakai .................. 474/28 |
| 5,010,990 | 4/1991 | Yoshimura et al. .................. 74/890 X |
| 5,086,889 | 2/1992 | Nobumoto et al. .................. 192/3.31 X |
| 5,090,527 | 2/1992 | Imamura et al. .................. 192/3.31 X |

FOREIGN PATENT DOCUMENTS

| | | | |
|---|---|---|---|
| 40794 | 12/1981 | European Pat. Off. .................. 74/890 |
| 47-32329 | 8/1972 | Japan . |
| 57-161360 | 10/1982 | Japan . |
| 61-116146 | 6/1986 | Japan . |
| 62-124343 | 6/1987 | Japan . |
| 1-148631 | 6/1989 | Japan .................. 74/890 |
| 1206155 | 8/1989 | Japan .................. 74/733.1 |
| 262445 | 3/1990 | Japan . |
| 2253049 | 10/1990 | Japan . |

Primary Examiner—Leslie A. Braun
Assistant Examiner—David E. Henn
Attorney, Agent, or Firm—Oblon, Spivak, McClelland, Maier & Neustadt

[57] ABSTRACT

A hydraulic control apparatus for controlling a vehicle power transmitting system including a belt-and-pulley type continuously variable transmission and a torque converter provided with a lock-up clutch. The transmission includes a pair of hydraulic actuators one of which receives a belt tensioning pressure for controlling a tension of a transmission belt. The hydraulic control apparatus includes a lock-up clutch control valve which is selectively placed in an engaging and a releasing position for engaging and releasing the lock-up clutch, respectively, a slip control valve for controlling an amount of slipping of the lock-up clutch until the clutch is fully engaged, a pressure control device for raising the belt tensioning pressure so as to increase the tension of the transmission belt; and a pilot-pressure generating device for applying a pilot pressure simultaneously to the slip control valve and the pressure control means, so that the belt tensioning pressure is raised while the slip control valve controls the amount of slipping of the lock-up clutch.

9 Claims, 13 Drawing Sheets

FIG. 8

| | CVT SHIFT MODE | 1ST SOLENOID VALVE 101 | 2ND SOLENOID VALVE 102 |
|---|---|---|---|
| I | RAPID SHIFT DOWN | ON | ON |
| II | MEDIUM SHIFT DOWN | ON | DUTY CYCLING |
| III | SLOW SHIFT DOWN | ON | OFF |
| IV | SLOW SHIFT UP | OFF | OFF |
| V | MEDIUM SHIFT UP | OFF | DUTY CYCLING |
| VI | RAPID SHIFT UP | OFF | ON |

FIG. 11

| HYDRAULIC CONTROL MODE | THIRD SOLENOID VALVE 103 | FIRST LINEAR SOLENOID VALVE 105 | SECOND LINEAR SOLENOID VALVE 106 | | | CONTROL MODES |
|---|---|---|---|---|---|---|
| | | | FOURTH SOLENOID VALVE 104 | LOCK-UP CLUTCH | SECOND LINE PRESSURE Pℓ2 | |
| A | OFF | OFF | OFF | OFF | RELEASE MODE (A) | NORMAL | ENGINE STOPPED LEVER 126 IN POSITION "N" |
| B | OFF | DUTY CYCLING | OFF | OFF | RAPID RELEASE MODE | NORMAL | ACCUMULATOR BACK PRESSURE CONTROL UPON N→D AND N→R SHIFTING OPERATIONS LOCK-UP CLUTCH RAPID RELEASE |
| C | OFF | OFF | DUTY CYCLING | OFF | RELEASE MODE (A) | REDUCTION | (Pℓ2 REDUCTION IN POSITION "N") Pℓ2 OPTIMALLY CONTROLLED |
| D | ON | ON | OFF | OFF | RELEASE MODE (B) | INCREASE | Pℓ2 INCREASE UPON R→N→D SHIFTING OPERATION (REVERSE VEHICLE RUN IN POSITION "R") |
| E | ON | OFF | OFF | OFF | ON | NORMAL | LOCK-UP CLUTCH ENGAGEMENT IN POSITION "D" |
| F | ON | DUTY CYCLING | OFF | OFF | SLIP CONTROL | INCREASE | LOCK-UP CLUTCH SLIP CONTROL |
| G | ON | OFF | DUTY CYCLING | OFF | ON | REDUCTION | Pℓ2 OPTIMALLY CONTROLLED |
| H | --- | --- | --- | ON | --- | NORMAL OR INCREASE | Pℓ2 REDUCTION INHIBIT, COMPULSORY SLOW SHIFT-DOWN MODE (UPON FAILURE OF SECOND LINEAR SOLENOID VALVE) |

HYDRAULIC CONTROL APPARATUS FOR POWER TRANSMITTING SYSTEM INCLUDING BELT-AND-PULLEY TYPE CONTINUOUSLY VARIABLE TRANSMISSION AND TORQUE CONVERTER EQUIPPED WITH LOCK-UP CLUTCH

BACKGROUND OF THE INVENTION

1. Field of the Invention

The present invention relates to a hydraulic control apparatus for controlling a power transmitting system for a motor vehicle, including a hydraulically operated continuously variable transmission of belt-and pulley type, and a torque converter equipped with a lock-up clutch.

2. Discussion of the Related Art

There is known a hydraulic control apparatus for controlling a power transmitting system incorporating a torque converter equipped with a lock-up clutch, and a belt-and-pulley type continuously variable transmission whose speed ratio is continuously variable. The continuously variable transmission includes a first and a second shaft, a pair of variable-diameter pulleys provided on the first and second shafts, respectively, a belt connecting the pulleys for transmitting power therebetween, and a pair of hydraulic actuators for changing effective diameters of the pulleys. The hydraulic control apparatus is adapted to generate a belt tensioning pressure for controlling the tension of the belt. Further, the hydraulic control apparatus includes a lock-up clutch control valve for controlling pressures to be applied to engaging and releasing chambers of the lock-up clutch, to selectively place the clutch in its engaged or released position.

An example of such a hydraulic control apparatus is disclosed in laid-open Publication No. 57-161360 of unexamined Japanese Patent Application. In the control apparatus disclosed in this publication, a pressure of a working fluid used for engaging or releasing the lock-up clutch is applied to a pressure regulating valve for the belt tensioning pressure indicated above, such that the belt tensioning pressure is raised when the lock-up clutch is released, while the same pressure is reduced when the clutch is engaged. In this arrangement, a torque capacity of the continuously variable transmission is advantageously increased when the torque converter performs a torque amplifying function (i.e., when the lock-up clutch is released), so that the transmission receives a sufficiently large input torque from the torque converter. When the torque converter is not in the position for performing the torque amplifying function (i.e., when the lock-up clutch is engaged), the tension of the belt is controlled to a required minimum value, so that the belt engages the pulleys with a required minimum force.

In the hydraulic control apparatus of the above type, the lock-up clutch is deliberately slipped for a given period of time, to mitigate shocks upon engagement of the clutch, so that the clutch may be smoothly engaged. When this slip control operation is effected, the torque converter may continue to effect the torque amplifying operation during a period from a point at which the lock-up clutch control valve is operated to the engaging position for engaging the clutch, to a point at which the clutch is fully engaged. Therefore, if the belt tensioning pressure is reduced when the lock-up clutch control valve is placed in the engaging position, the belt may undesirably slip on the pulleys due to the torque amplifying operation of the torque converter, until the engaging action of the clutch is completed.

SUMMARY OF THE INVENTION

It is therefore an object of the present invention to provide a hydraulic control apparatus for controlling a power transmitting system for a motor vehicle, including a hydraulically operated belt-and-pulley type transmission and a torque converter provided with a lock-up clutch, which apparatus is adapted to prevent slipping of a belt of the transmission due to a torque amplifying operation of the torque converter, during a slip control operation for the lock-up clutch upon engagement of the clutch.

The above object may be attained according to the principle of the present invention, which provides a hydraulic control apparatus for controlling a power transmitting system of a motor vehicle, including a hydraulically operated continuously variable transmission and a torque converter provided with a lock-up clutch, the transmission including a first and a second shaft, a pair of variable-diameter pulleys provided on the first and second shafts, respectively, a transmission belt connecting the pair of pulleys, and a pair of hydraulic actuators for changing effective diameters of the pulleys for continuously variably changing a speed ratio of the transmission, one of the pair of hydraulic actuators receiving a belt tensioning pressure for controlling a tension of the transmission belt, the torque converter having an engaging chamber which receives a first pressure for engaging the lock-up clutch, and a releasing chamber which receives a second pressure for releasing the lock-up clutch, the hydraulic control apparatus comprising: (a) a lock-up clutch control valve which is placed in an engaging position and a releasing position for engaging and releasing the lock-up clutch, respectively, the lock-up clutch control valve controlling the first and second pressures to be applied to the engaging chamber and the releasing chamber, to selectively engage and release the lock-up clutch; (b) a slip control valve for regulating a difference between the first and second pressures for a predetermined period of time after the lock-up clutch control valve is operated to the engaging position, so as to control an amount of slipping of the lock-up clutch until the clutch is fully engaged; (c) pressure control means for raising the belt tensioning pressure so as to increase the tension of the transmission belt; and (d) pilot-pressure generating means for applying a pilot pressure simultaneously to the slip control valve and the pressure control means for the predetermined period of time after the lock-up clutch control valve is operated to the engaging position, so that the belt tensioning pressure is raised while the slip control valve controls the amount of slipping of the lock-up clutch.

In the hydraulic control apparatus of the present invention constructed as described above, the pilot pressure is applied simultaneously to the slip control valve and the pressure control means, for a given period of time after the lock-up clutch control valve is operated to the position for engaging the lock-up clutch. Thus, the belt tensioning pressure is raised whenever the slip control for the lock-up clutch is effected for smooth engagement of the clutch.

While the lock-up clutch is deliberately slipped during its engaging action, therefore, the torque capacity of the continuously variable transmission is increased with the rise in the belt tensioning pressure. Consequently, the transmission belt is prevented from slipping on the pulleys, in spite of the torque amplifying operation of the torque converter which continues even after the lock-up clutch control valve is operated to the engaging position.

According to the present invention, the common pilot pressure is simultaneously used for effecting the slip control of the lock-up clutch and the pressure control for raising the belt tensioning pressure. Accordingly, a hydraulic circuit for the present control apparatus is simplified, making the control apparatus small-sized and lightweight. Further, it is unnecessary for the present hydraulic control apparatus to adjust timing for controlling the tension of the belt upon engagement of the lock-up clutch.

BRIEF DESCRIPTION OF THE DRAWINGS

The above and optional objects, features and advantages of the present invention will become more apparent by reading the following detailed description of a presently preferred embodiment of the present invention, when considered in conjunction with the accompanying drawings, in which:

FIG. 8 is a view indicating a relationship between a shifting mode of the CVT and on-off states of a first and a second solenoid-operated valve of a shift control valve assembly incorporated in the apparatus of FIGS. 2-4;

FIG. 11 is a view indicating a relationship between hydraulic control modes A through H of the apparatus of FIGS. 2-4 and different combinations of states of third and fourth solenoid-operated valves and first and second linear solenoid valves;

DETAILED DESCRIPTION OF THE PREFERRED EMBODIMENT

Figure 1:
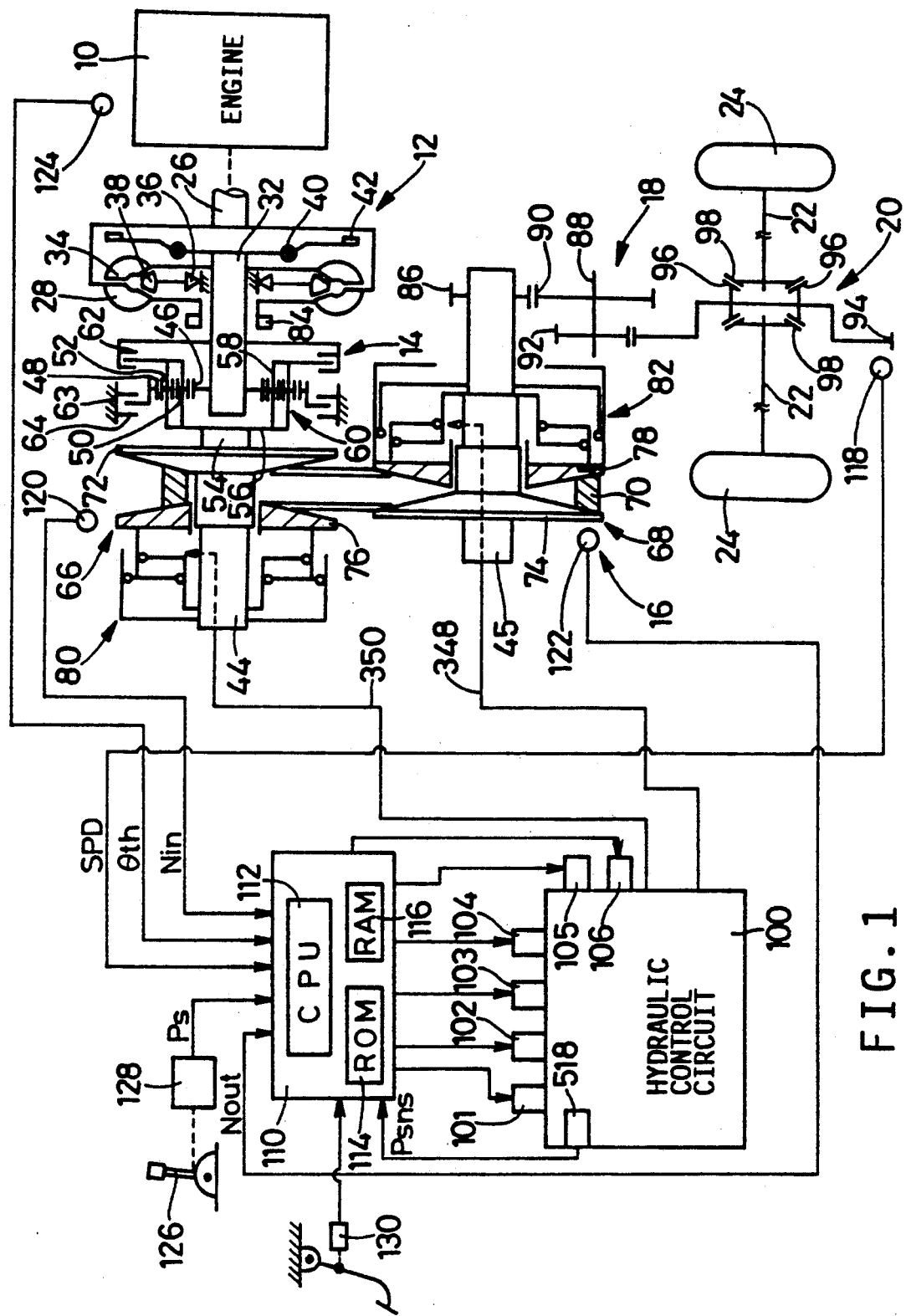
FIG. 1 is a schematic view of a vehicle power transmitting system including a continuously variable transmission, which is equipped with a hydraulic control apparatus constructed according to one embodiment of the present invention.

Referring first to FIG. 1, there is illustrated a power transmitting system of an automotive vehicle, for transmitting power from an engine 10 to drive wheels 24, 24. The power transmitting system includes: a fluid torque converter 12 connected to the engine 10 and equipped with a lock-up clutch 42; a reversing gear mechanism in the form of a reversing device 14 connected to the torque converter 12, for selecting a forward or a reverse running of the vehicle; a continuously variable transmission (hereinafter referred to as "CVT") 16 connected to the reversing device 14; a reduction gear device 18 connected to the CVT 16; a differential gear device 20 connected to the reduction gear device 18; and drive axles 22 connected to the differential gear device 20 and drive wheels 24.

The fluid torque converter 12 includes a pump impeller 28 connected to a crankshaft 26 of the engine 10; a turbine impeller 34 which is fixed to an output shaft 32 of the converter 12 and which is rotated by means of a working fluid from the pump impeller 28; a stator impeller 38 which is fixed to a stationary member through a one-way clutch 36; and the lock-up clutch 42 indicated above, which is fixed to the output shaft 32 through a damper 40. The output shaft 32 of the converter 12 is located between the crankshaft 26 and a center shaft 54 of the reversing device 14, in coaxial relationship with these shafts 26, 54. The torque converter 12, which is filled with the working fluid, is adapted to transmit torque between the pump impeller 28 and the turbine impeller 34, to provide a desired ratio of the speeds of the crankshaft 26 and the output shaft 32, while the lock-up clutch 42 is disengaged or released. The torque converter 12 is operated to effect engagement of the lock-up clutch 42 for direct connection of the crankshaft 26 to the output shaft 32, when the speed of the vehicle, engine 10 or turbine impeller 34 exceeds a predetermined value.

The reversing device 14 is a well-known double-pinion type planetary gear mechanism, which is disposed coaxially between the output shaft 32 of the torque converter 12 and an input shaft 44 of the CVT 16, for selecting a forward or a reverse running of the vehicle depending upon the currently selected operating position of a shift lever 126. This planetary gear mechanism includes: a sun gear 46 which is fixed on the output shaft 32 serving as an input shaft of the reversing device 14;

a ring gear 48 disposed concentrically with the sun gear 46; a pair of planetary gears 50, 52 which mesh with the sun gear 46 and the ring gear 48, respectively, while meshing with each other; the center shaft 54 indicated above, which is disposed concentrically with the sun and ring gears 46, 48; and a carrier 60 including a flange 56 which extends radially outwards from the center shaft 54, and a carrier pin 58 for rotatably supporting the planetary gears 50, 52 provided on the flange 56 to extend in the direction parallel to the axis of the center shaft 54. The reversing device 14 further includes a FORWARD clutch 62 for connecting the output shaft 32 of the torque converter 12 and the carrier 60, and a REVERSE brake 64 for connecting the ring gear 48 and a housing 63 for stopping the rotation of the ring gear 48.

The FORWARD clutch 62 and REVERSE brake 64 are hydraulically operated, frictionally coupling devices. When the FORWARD clutch 62 is engaged, the output shaft 32 of the torque converter 12 and the carrier 60 are connected to each other, whereby the center shaft 54 of the reversing device 14 is rotated with the output shaft 32, so as to run the vehicle in the forward direction. When the REVERSE brake 64 is engaged, on the other hand, the housing 63 and the ring gear 48 are connected to each other so as to stop the rotation of the ring gear 48, whereby the direction of rotation of the center shaft 54 is reversed with respect to the direction of rotation of the output shaft 32 of the converter 12. Consequently, power is transmitted so as to run the vehicle in the reverse direction.

The CVT 16 includes a first and a second variable-diameter pulley 66, 68 which are provided on the input shaft 44 and an output shaft 45, respectively, and a transmission belt 70 for connecting these pulleys 66, 68. The transmission belt 70 includes a multiplicity of blocks which are connected in series to form an endless annular hoop or chain, and which are pressed against walls of the pulleys 66, 68 which define respective V grooves, as disclosed in laid-open Publication Nos. 61-116146 and 2-62445 of unexamined Japanese Patent Applications. The pulleys 66, 68 have respective stationary rotors 72, 74 fixed to the respective input and output shafts 44, 45, and respective axially movable rotors 76, 78 which are axially movable on the respective shafts 44, 45 and rotated with these shafts. The movable rotors 76, 78 are moved by respective first and second hydraulic actuators in the form of first and second hydraulic cylinders 80, 82, whereby the effective widths of the V grooves of the pulleys 66, 68, i.e., the effective diameters engaging the belt 70 are changed, to change a speed ratio "r" of the CVT 16 (Nin/Nout, where Nin=speed of the input shaft 44, and Nout=speed of the output shaft 45). While the first hydraulic cylinder 80 is operated primarily for changing the speed ratio "r" of the CVT 16, the second hydraulic cylinder 82 is operated primarily for adjusting the tension of the belt 70 to the smallest value within an optimum range in which the belt 70 does not slip on the pulleys 66, 68. Reference numeral 84 denotes an oil pump serving as a hydraulic power source of a hydraulic system, which constitutes a part of a hydraulic control apparatus constructed according to the instant embodiment of the present invention. The oil pump 84 is connected to the pump impeller 28 of the torque converter 12, whereby the pump 84 is always rotated with the crankshaft 26 of the engine 10.

The reduction gear device 18 includes a first gear 86 which serves as an output gear of the device 18 and which is provided on the output shaft 45 of the CVT 16, a rotary shaft 88 which is rotatable about its axis parallel to the axis of the first gear 86, a second gear 90 which is fixed on the shaft 88 and meshes with the first gear 86, and a third gear 92 which is fixed on the shaft 88 and meshes with a large-diameter gear 94 of the differential gear device 20. The third gear 92 has a smaller diameter than the second gear 90.

The differential gear device 20 includes a pair of small differential gears 96 which are rotated with the large-diameter gear 94, about the axis perpendicular to the axis of rotation of the drive axles 22, and a pair of large differential gears 98 which mesh with the small differential gears 96 and are connected to the drive axles 22. In this arrangement, power transmitted from the reduction gear device 18 is divided by the differential gear device 20 into two portions, which are transmitted to the right and left drive wheels 24 through the respective drive axles 22.

An electronic control device 110 includes a so-called microcomputer which incorporates a central processing unit (CPU) 112, a random-access memory (RAM) 114 a read-only memory (ROM) 116 and an interface (not shown). The control device 110 receives various signals from various sensors, such as: a VEHICLE speed sensor 118 disposed to detect the rotating speed of the drive wheels 24, and generating a vehicle speed signal representative of the detected speed, i.e., a running speed SPD of the vehicle; an INPUT SHAFT speed sensor 120 disposed to detect the rotating speed of the input shaft 44 of the CVT 16, and generating an input shaft speed signal representative of the detected speed Nin of the input shaft 44; and an OUTPUT SHAFT speed sensor 122 disposed to detect the speed of the output shaft 45 of the CVT 16, and generating an output shaft speed signal representative of the detected speed Nout of the output shaft 45; a THROTTLE sensor 124 disposed to detect an angle $\theta$th of opening of a throttle valve disposed in a suction pipe of the engine 10, and generating a throttle signal representative of the opening angle $\theta$th of the throttle valve; a SHIFT LEVER sensor 128 disposed to detect the currently selected operating position of the shift lever 126, and generating a signal representative of the currently selected position Ps of the shift lever 126; and a BRAKE switch 130 disposed to detect an operation of a brake pedal of the vehicle, and generating a signal indicative of the operation of the brake pedal. The CPU 112 of the electronic control device 110 processes these input signals according to control programs stored in the ROM, while utilizing a temporary data storage function of the RAM, and applies appropriate drive or control signals to a first, a second, a third and a fourth solenoid-operated valve 101, 102, 103 and 104, and a first and a second linear solenoid valve 105 and 106, which are incorporated in a hydraulic control circuit 100 for controlling the vehicle power transmitting system of FIG. 1.

Figure 2:
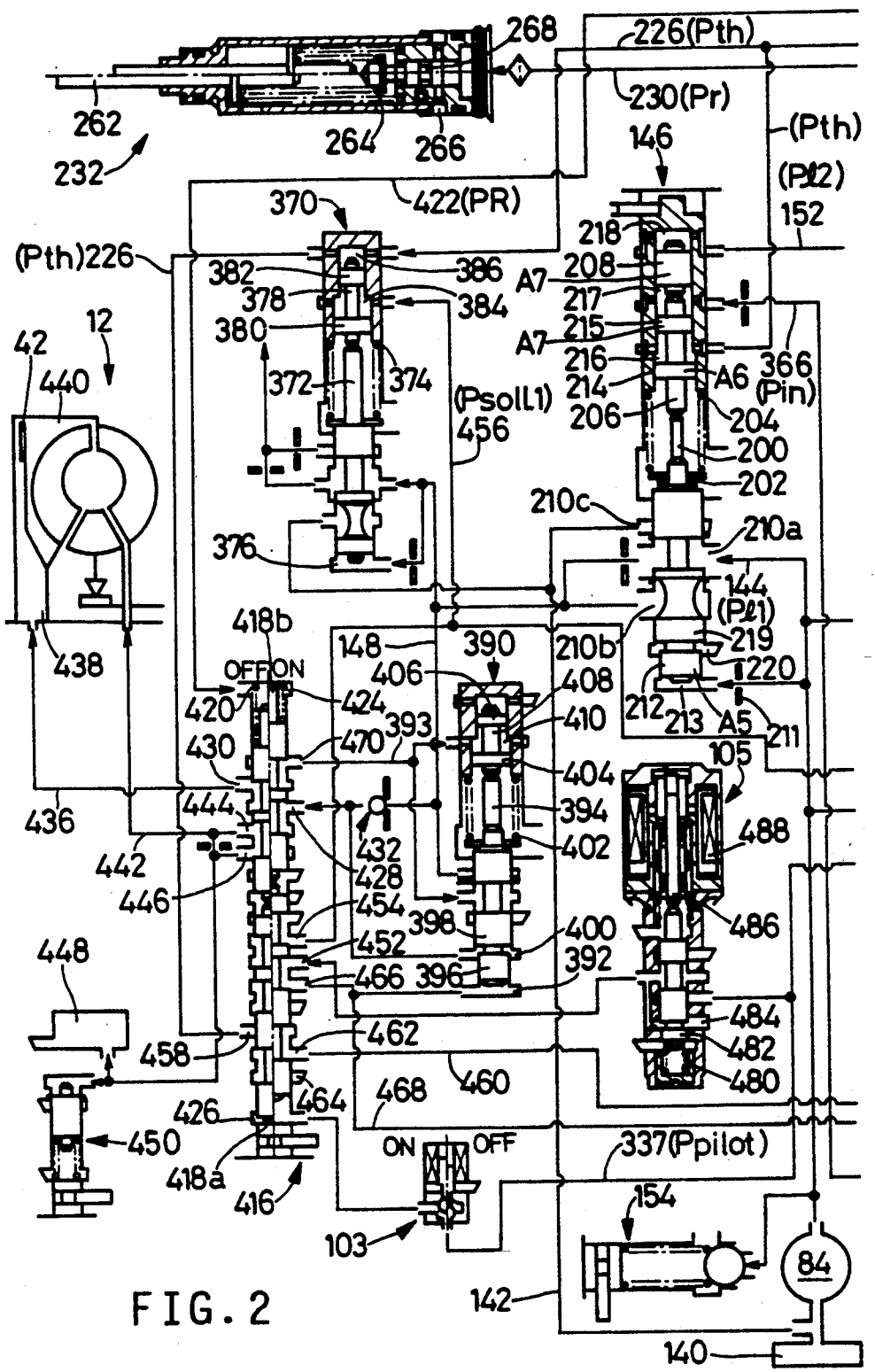
FIG. 2 is a hydraulic circuit diagram showing a part of the hydraulic control apparatus adapted to control the power system of FIG. 1.
Figure 3:
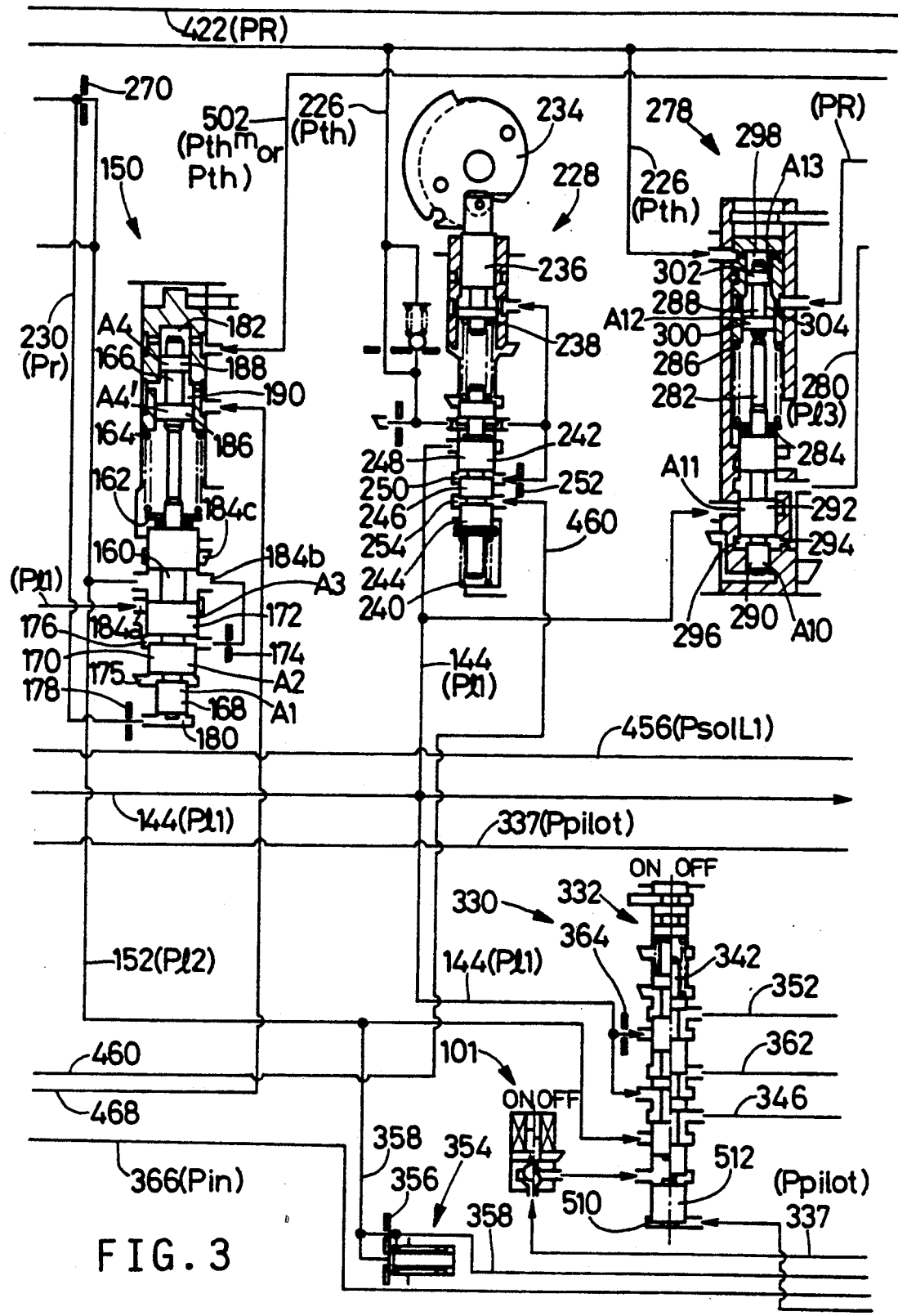
FIG. 3 is a hydraulic circuit diagram showing another part of the hydraulic control apparatus adapted to control the power transmitting system of FIG. 1.
Figure 4:
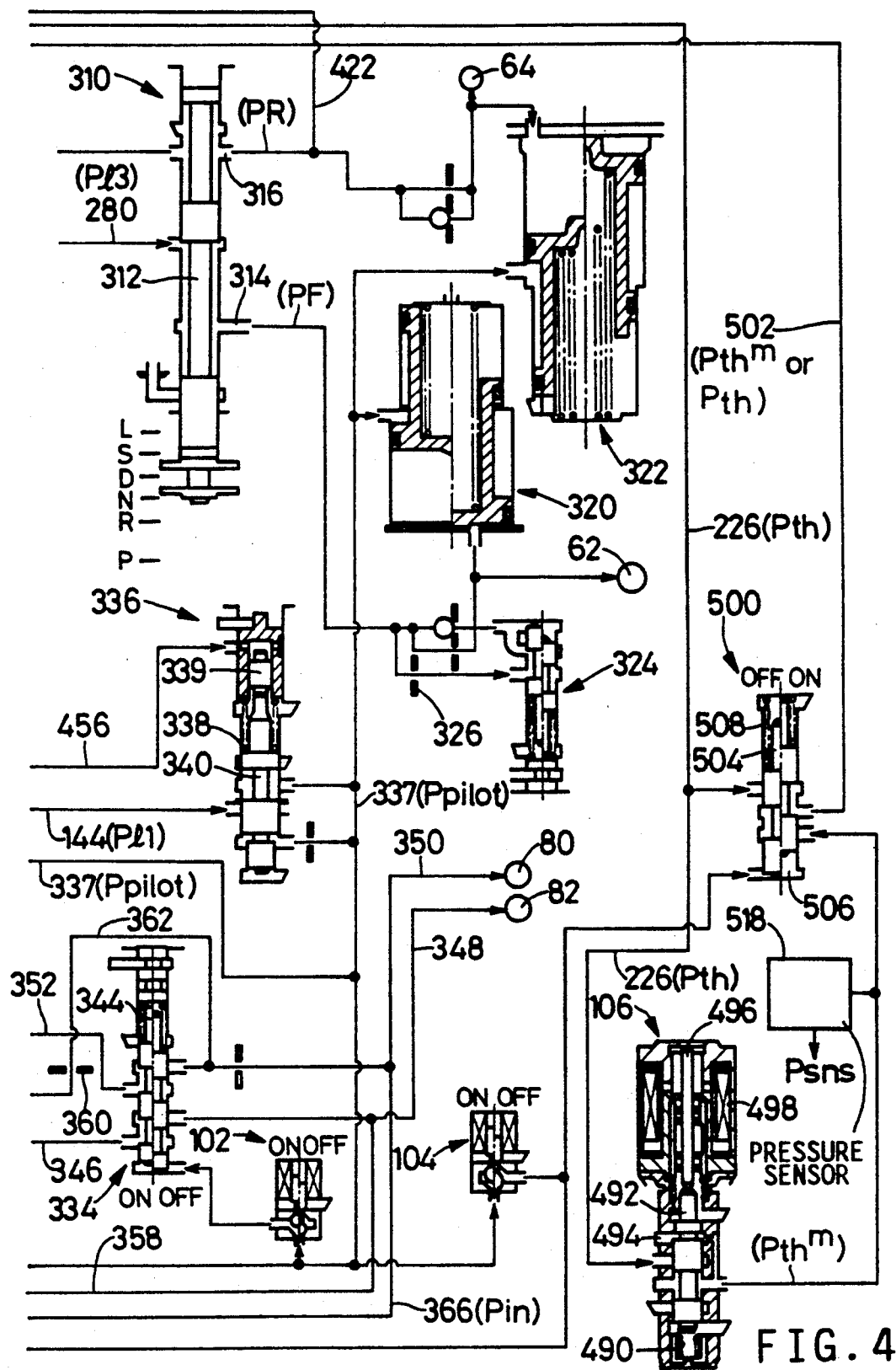
FIG. 4 is a hydraulic circuit diagram showing a further part of the hydraulic control apparatus adapted to control the power transmitting system of FIG. 1.

Referring next to FIGS. 2, 3 and 4 showing different portions of the hydraulic control circuit 100, the oil pump 84 as the hydraulic power source pumps up a working fluid through a strainer 140 from a reservoir to which the fluid is returned. The pump 84 also communicates with a return line 142, so that the fluid returned through the return line 142 is sucked into the pump 84. The pressurized fluid produced by the pump 84 is delivered as a first line pressure Pl1 into a first pressure line 144. In the present embodiment, the first line pressure Pl1 is regulated by an overflow or relief type first pressure regulating valve 146 (FIG. 2), which discharges the fluid in the first pressure line 144 into the return line 142 and a lock-up pressure line 148. The first line pressure Pl1 is lowered by a second pressure regulating valve 150 (FIG. 3), to produce a second line pressure Pl2 in a second pressure line 152. The second pressure regulating valve 150 is of a pressure reducing type, contrary to the overflow type of the first pressure regulating valve 146. The first pressure line 144 is provided with a relief valve 154 (FIG. 2) for preventing the first line pressure Pl1 from excessively rising beyond a predetermined level.

Referring to FIG. 3, the second pressure regulating valve 150 will be described. This valve 150 includes a valve spool 160 for effecting connection and disconnection of the first pressure line 144 to and from the second pressure line 152, a spring sheet 162, a return spring 164, and a plunger 166. The valve spool 160 is provided at one axial end portion thereof remote from the plunger 166, with a first, a second and a third land 168, 170 and 172, which have different diameters. The first land 168 at the extreme end of the spool 160 has the smallest diameter, while the axially innermost third land 172 has the largest diameter. Between the second and third lands 170, 172, there is formed a chamber 176 to which is applied as a feedback pressure the second line pressure Pl2 through a flow restrictor 174, so that the valve spool 160 is biased toward its closed position by the second line pressure Pl2. Another chamber 180 is formed adjacent to the first land 168 at the above-indicated one end of the valve spool 160. To this chamber 180, there is applied a SPEED-RATIO pressure Pr (which will be described) through a flow restrictor 178. This pressure Pr also biases the valve spool 160 toward the closed position. The return spring 164 disposed around the valve spool 160 biases the spool 160 toward its open position, through the spring sheet 162. The plunger 166 has a small-diameter land 188 at one axial end portion thereof, which partially defines another chamber 182. The chamber 182 is adapted to receive a modified THROTTLE pressure Pth$^m$ (which will be described) which biases the spool 160 toward its open position.

The valve spool 160 is positioned under equilibrium of forces according to the following equation (1):

$$Pl2 = (A4 \cdot Pth^m + W - A1 \cdot Pr)/(A3 - A2) \quad (1)$$

where,
A1: pressure-receiving area of the first land 168
A2: pressure-receiving area of the second land 170
A3: pressure-receiving area of the third land 172
A4: pressure-receiving area of the small-diameter land 188 of the plunger 166
W: biasing force of the return spring 164

Figure 5:
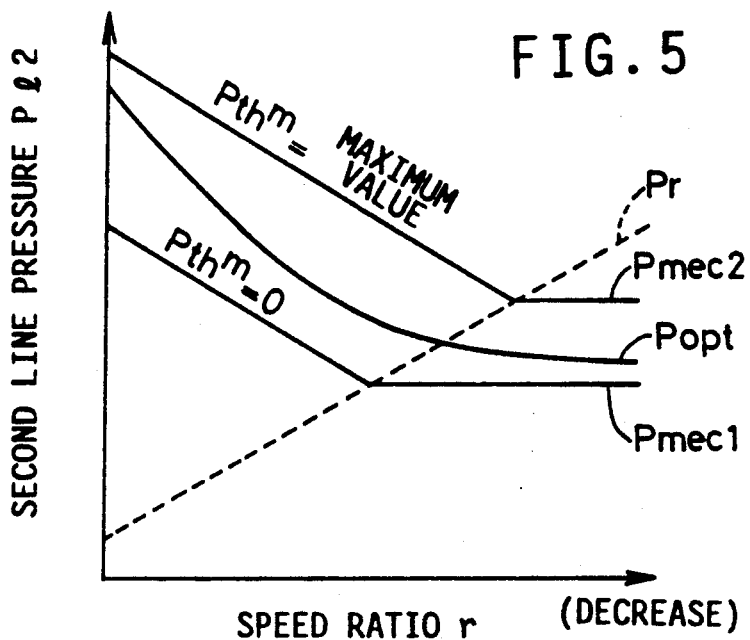
FIG. 5 is a graph showing an output characteristic of a second pressure regulating valve incorporated in the apparatus of FIGS. 2-4.

Namely, the valve spool 160 is axially moved according to the equation (1), so as to repeatedly alternately establish communication between a port 184a and a port 184b for permitting a flow of the fluid from the first pressure line 144 into the second pressure line 152, and communication between the port 184b and a drain port 184c for draining the second pressure line 152 through the drain port 184c. As a result, the second line pressure Pl2 is produced. Since the second pressure line 152 is a closed hydraulic circuit, the second line pressure Pl2 can be adjusted by the second pressure regulating valve 150, by lowering the relatively high first line pressure Pl1, as indicated in FIG. 5. Between the first and second lands 168, 170 of the valve spool 160, there is formed a chamber 175 which is open to the atmosphere. The plunger 166 also has a large-diameter land 186, which is located near the small-diameter land 188, and cooperates with the land 188 to define another chamber 190. The chamber 190 is adapted to receive a pilot pressure PsolL1 from the above-indicated first linear solenoid valve 105, so that the second line pressure Pl2 is temporarily increased in a slip control operation (while will be described later) from the lock-up clutch 42 upon engagement of the lock-up clutch 42. As shown in the graph of FIG. 5, a first basic output pressure Pmec1 is produced as the second line pressure Pl2, according to the equation (1) indicated above, where the modified THROTTLE pressure Pth$^m$ is zero, while a second basic output pressure Pmec2 is produced according to the equation (1), where the modified THROTTLE pressure Pth$^m$ is its maximum value.

Referring back to FIG. 2, the first pressure regulating valve 146 will then be described. This valve 146 includes a valve spool 200, a spring sheet 202, a return spring 204, a first plunger 206 having a first and a second land 214, 215, and a second plunger 208 whose diameter is the same as the second land 215 of the first plunger 206. The valve spool 200 is operated to effect selective connection and disconnection of a port 210a communicating with the first pressure line 144, to and from a drain port 210b or 210c. The valve spool 200 has a first land 212 at one axial end thereof remote from the first and second plungers 206, 208. Adjacent to the first land 212 of the spool 200, there is formed a chamber 213 which receives as a feedback pressure the first line pressure Pl1 through a flow restrictor 211. The valve spool 200 is biased toward its open position by this first line pressure Pl1. The first and second lands 214, 215 of the first plunger 206 cooperate with each other to define a chamber 216 adapted to receive the THROTTLE pressure Pth. Between the second land 215 of the first plunger 206 and the second plunger 208, there is formed a chamber 217 adapted to receive a pressure Pin in the first hydraulic cylinder 80, through a branch line 366. Further, a chamber 218 is formed adjacent to the end face of the second plunger 208. The chamber 218 receives the second line pressure Pl2. The biasing force of the above-indicated return spring 204 acts on the valve spool 200 through the spring sheet 202 so as to bias the spool 200 toward its closed position. The valve spool 200 is positioned under equilibrium of forces according to the following equation (2):

$$Pl1 = [(Pin \text{ or } Pl2) \cdot A7 + Pth(A6 - A7) + W]/A5 \quad (2)$$

where,
A5: pressure-receiving area of the first land 212 of the valve spool 200
A6: cross sectional area of the first land 214 of the first plunger 206
A7: cross sectional area of the second land 215 of the first plunger 206 (second plunger 208)
W: biasing force of the return spring 204

In the first pressure regulating valve 146, the first and second plungers 206, 208 are separated from each other and a thrust due to the pressure Pin in the first cylinder 80 acts on the valve spool 200 in the direction toward the closed position, when the pressure Pin is higher than the second line pressure Pl2 (which is normally equal to the pressure Pout in the second cylinder 82). When the pressure Pin is lower than the second line pressure Pl2, the first and second plungers 206, 208 are held in abutting contact with each other, whereby a thrust due to the second line pressure Pl2 acting on the end face of the second plunger 208 acts on the valve spool 200 in the direction toward its closed position. That is, the second plunger 208 receiving the pressure Pin and the second line pressure Pl2 applies to the spool 200 a force based on the higher one of the pressures Pin and Pl2, so that the spool 200 is biased toward its closed position. Between the first land 212 and a second land 219 of the valve spool 200, there is formed a chamber 220 which is open to the atmosphere.

Figure 6:
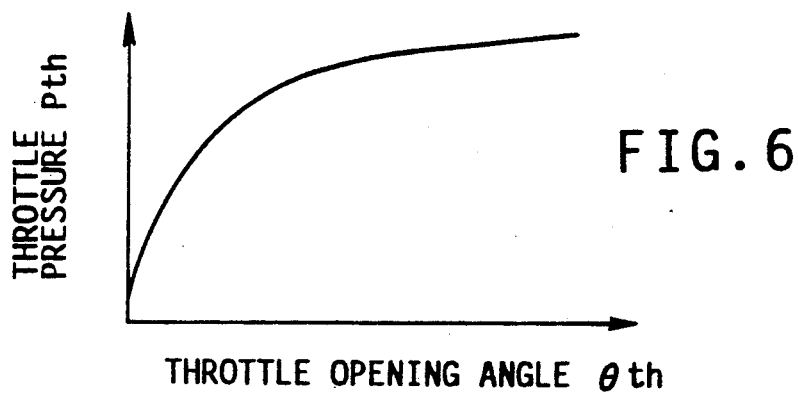
FIG. 6 is a graph showing an output characteristic of a throttle sensing valve incorporated in the apparatus of FIGS. 2-4.

Referring to FIGS. 2 and 3, the THROTTLE pressure Pth representing the actual opening angle θth of the throttle valve of the engine 10 is generated by a throttle sensing valve 228. Further, the SPEED-RATIO pressure Pr representing an actual speed ratio "r" of the CVT 16 is generated by a speed-ratio sensing valve 232. Described specifically, the throttle sensing valve 228 includes: a cam 234 rotated as the throttle valve is operated; a plunger 236 which engages a cam surface of the cam 234 and which is axially moved by a distance corresponding to an angle of rotation of the cam 234; a spring 238; a spring 240; and a valve spool 242 which receives a thrust through the spring 238 from the plunger 236, a biasing force of the spring 240 and a thrust due to a feedback pressure (THROTTLE pressure Pth). The thrust force received from the plunger 236 acts on the spool 242 in one direction, while the biasing force of the spring 240 and the thrust force based on the feedback pressure act on the spool 242 in the other direction. The valve spool 242 is moved to a position of equilibrium of the above three forces, whereby the first line pressure Pl1 is reduced so as to produce the THROTTLE pressure Pth corresponding to the actual opening angle θth of the throttle valve. The valve spool 242 has a first, a second and a third land 244, 246, 248, which have different diameters. The first land 244 at the extreme end of the spool 242 remote from the plunger 236 has the smallest diameter, while the axially innermost third land 248 has the largest diameter. Between the second and third lands 246, 248, there is formed a chamber 250 which receives the feedback pressure through a flow restrictor 252. Between the first and second lands 244, 246, there is formed another chamber 254 which receives the feedback pressure through a lock-up clutch control valve 416 (which will be described). Since this feedback pressure acts on the spool 242 so as to lower the THROTTLE pressure Pth, the THROTTLE pressure Pth is higher when the lock-up clutch 42 is placed in the released position (OFF), than when the clutch 42 is placed in the engaged position (ON), whereby the torque transmitting capacity of the power transmitting system is increased while the torque converter 12 performs its torque amplifying function with the lock-up clutch 42 being released. The thus obtained THROTTLE pressure Pth is applied through a line 226 to the above-described first and second pressure regulating valves 146, 150, a third pressure regulating valve 278, a relay valve 500 and a second linear solenoid valve 106. The relationship between the THROTTLE pressure Pth and the opening angle θth is indicated in the graph of FIG. 6.

Figure 7:
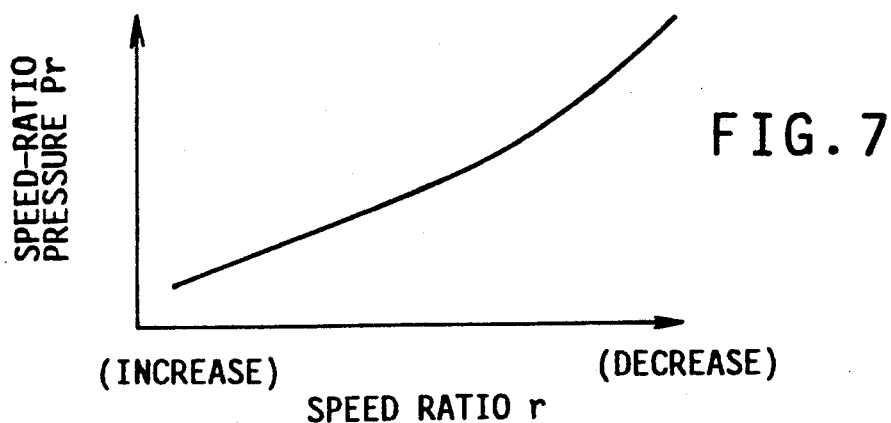
FIG. 7 is graph showing an output characteristic of a speed-ratio sensing valve incorporated in the apparatus of FIGS. 2-4.

The speed-ratio sensing valve 232 includes: a sensing rod 262 which slidably contacts the axially movable rotor 76 on the input shaft 44 of the CVT 16 and which is axially displaced by a distance equal to an amount of axial movement of the movable rotor 76; a spring 264 whose biasing force varies as the axial position of the rod 262 is changed; and a valve spool 268 which receives the biasing force of the spring 264 and a SPEED-RATIO pressure Pr. The valve spool 268 is moved to a position of equilibrium of the biasing force of the spring 264 and a thrust force based on the second line pressure Pl2, whereby the amount of discharge flow of the fluid from the second pressure line 152 into a drain port 266 is adjusted depending upon the speed-ratio "r" of the CVT 16. For example, as the movable rotor 72 is moved toward the stationary rotor 76 so as to reduce the effective width of the V-groove of the first pulley 66 and thereby decrease the speed ratio "r", the sensing rod 262 is moved in a direction to compress the spring 264, thereby reducing the rate of flow of the fluid which is supplied from the second pressure line 152 through an orifice 270 and discharged into the drain by a resulting movement of the valve spool 268. As a result, the pressure in a line 230 downstream of the orifice 270 is increased. This pressure is utilized as the SPEED-RATIO pressure Pr, which increases with a decrease in the speed ratio "r" of the CVT 16 (so as to shift-up the CVT 16 for increasing the vehicle speed), as indicated in the graph of FIG. 7. The pressure Pr is applied through the line 230 to the chamber 180 of the second pressure regulating valve 150.

It will be understood from the above description of the speed-ratio sensing valve 232 that since the SPEED-RATIO pressure Pr is produced by changing the amount of discharge of the fluid supplied from the second pressure line 152 through the orifice 270, the pressure Pr will not exceed the second line pressure Pl2. Further, the second line pressure Pl2 is lowered with an increase in the pressure Pr, by the second pressure regulating valve 150 according to the equation (1) indicated above. Therefore, when the pressure Pr increases up to the level of the second line pressure Pl2, both of the pressures Pr and Pl2 are held constant, as indicated in the graph of FIG. 5, which shows the basic output characteristic of the second pressure regulating valve 150. Namely, the first and second basic output pressures Pmec1 and Pmec2 are adjusted by the valve 150 in relation to the above-indicated SPEED-RATIO pressure Pr, so that the pressure Pmec1, Pmec2 linearly decreases with an increase in the SPEED-RATIO pressure Pr when the speed ratio "r" of the CVT 16 changes from the maximum value to a given value. After the speed ratio "r" reaches the given value where the basic output pressure Pmec1, Pmec2 is equal to the SPEED-RATIO pressure Pr, the pressure Pmec1, Pmec2 is held constant. The bent lines of FIG. 5 which are indicative of the first and second basic output pressures Pmec1 and Pmec2 are approximate to an ideal curve indicative of an optimum value Popt of the second pressure line Pl2 for maintaining the tension of the transmission belt 70 at a required minimum level. More specifically, the first basic output pressure Pmec1 is more or less lower than the optimum value Popt on the ideal curve while the second basic output pressure Pmec2 is more or less higher than the optimum value Popt. While the vehicle is running in the forward direction with the lock-up clutch 42 placed in the engaged position, for example, the electronic control device 110 controls the modified THROTTLE pressure $Pth^m$ applied to the chamber 182 of the second pressure regulating valve 150, as described later, so that the second line pressure Pl2 is regulated into the optimum value Popt indicated above, by eliminating a difference between the first basic output pressure Pmec1 and the optimum value Popt.

The third pressure regulating valve 278 indicated above is adapted to produce in a third pressure line 280 a third line pressure Pl3 suitable for operating the REVERSE brake 64 and FORWARD clutch 62 of the reversing device 14. This valve 278 includes a valve spool 282 for effecting selective connection and disconnection of the first pressure line 144 to and from the third pressure line 280, a spring sheet 284, a return spring 286 and a plunger 288. The valve spool 282 has a first land 290, and a second land 292 having a larger diameter than the first land 290. Between these first and second lands 290, 292, there is formed a chamber 296 adapted to receive the third line pressure Pl3 as a feedback pressure through a flow restrictor 294, so that the spool 282 is biased toward its closed position by the pressure Pl3. In the third pressure regulating valve 278, a biasing force of the return spring 286 acts on the spool 282 through the spring sheet 284, so that the spool 282 is biased toward its open position by the spring 286. Adjacent to the end face of the plunger 288, there is formed a chamber 298 adapted to receive the THROTTLE pressure Pth, so that the spool 282 is biased toward the open position by the THROTTLE pressure Pth. The plunger 288 has a first land 300, and a second land 302 having a smaller diameter than the first land 300. Between these first and second lands 300, 302, there is formed a chamber 304 adapted to receive a REVERSE-POSITION pressure $P_R$ (=third line pressure Pl3) only when the vehicle runs in the reverse direction with the REVERSE brake 64 placed in the engaged position. In the third pressure regulating valve 278 constructed as described above, the third line pressure Pl3 is controlled to an optimum level based on the THROTTLE pressure Pth, according to the following equation (3) when the vehicle runs in the forward direction, and according to the following equation (4) when the vehicle runs in the reverse direction. The optimum level is a permissible lowest value required to assure optimum torque transmitting capacity of the FORWARD clutch 62 and the REVERSE brake 64 during engagement of the clutch 62 or brake 64 to run the vehicle in the forward or reverse direction, without slipping of the clutch 62 or brake 64.

$$Pl3 = (A13 \cdot Pth + W)/(A11 - A10) \quad (3)$$

$$Pl3 = [A13 \cdot Pth + W + (A12 - A13) \cdot P]/(A11 - A10) \quad (4)$$

where,
- A10: pressure-receiving area of the first land 290 of the valve spool 282
- A11: pressure-receiving area of the second land 292 of the valve spool 28
- A12: pressure-receiving area of the first land 300 of the plunger 288
- A13: pressure-receiving area of the second land 302 of the plunger 288
- W: biasing force of the return spring 286

The thus regulated third line pressure Pl3 is applied to the FORWARD clutch 62 or REVERSE brake 64 by means of a shift lever valve 310. This shift lever valve 310 has a valve spool 312 which is moved in response to an operation of the shift lever 126, which has six operating positions, i.e., NEUTRAL "N", PARKING "P", LOW "L", SECOND "S", DRIVE "D" and REVERSE "R". The shift lever valve 310 has an outlet port 314 and an outlet port 316. When the shift lever 126 is placed in the NEUTRAL position "N", the third line pressure Pl3 is not generated by the shift lever valve 310, so that the reversing device 14 is placed in a neutral position. When the shift lever 126 is placed in one of the LOW, SECOND and DRIVE positions "L", "S" and "D", the third line pressure Pl3 is supplied as a FORWARD-POSITION pressure $P_F$ to the FORWARD clutch 62, primarily through the outlet port 314, while at the same time the fluid is discharged from the REVERSE brake 64. Thus, the reversing device 14 is placed in a forward position to run the vehicle in the forward direction. When the shift lever 126 is placed in the REVERSE position "R", the third line pressure Pl3 is supplied as the above-indicated REVERSE-POSITION pressure $P_R$, through the outlet port 316 to the third pressure regulating valve 278, lock-up clutch control valve 416 and REVERSE brake 64, while at the same time the fluid is discharged from the FORWARD clutch 62. Thus, the reversing device 14 is placed in a reverse position to run the vehicle in the reverse direction. When the shift lever 126 is placed in the PARKING position "P", the fluid is discharged from the FORWARD clutch 62 and the REVERSE brake 64 at the same time. Accumulators 320 and 322 are connected to the clutch 62 and brake 64, respectively, for the purpose of slowly raising the pressure applied to the clutch and brake 62, 64, so that the frictionally coupling devices of the brake and clutch may be smoothly engaged. A shift timing valve 324 connected to the clutch 62 functions to prevent a transient excessively high rate of flow of the fluid to the clutch 62, such that a flow restrictor 326 is closed with a rise in the FORWARD-POSITION pressure $P_F$ upon engagement of the clutch 62.

The first and second line pressures Pl1 and Pl2 adjusted by the first and second pressure regulating valves 146, 150, respectively, are applied to the one and the other of the first and second hydraulic cylinders 80, 82 of the CVT 16 through a shift control valve assembly 330, for controlling the speed ratio "r" of the CVT 16. The shift control valve assembly 330 has a directional control valve 332 and a flow control valve 334. These control valves 332, 334 are actuated by a pilot pressure Ppilot, which is generated by a pilot pressure regulating valve 336 based on the first line pressure Pl1, and is applied through a pilot pressure line 337 to the first, second third and fourth solenoid-operated valves 101, 102, 103 and 104, and the first and second linear solenoid valves 105 and 106. The pilot pressure regulating valve 336 includes a spring 338; a plunger 339 which receives the pilot pressure PsolL1 from the first linear solenoid valve 105 through the lock-up clutch control valve 416; and a valve spool 340 which is biased toward its closed position by a biasing force of the spring 338, and a thrust force received from the plunger 339 based on the pilot pressure PsolL1, and biased toward its open position by a force based on a feedback pressure (pilot pressure Ppilot). The valve spool 340 is moved to a position of equilibrium of the above three forces. Thus, the pilot pressure Ppilot is regulated based on the pilot pressure PsolL1.

The directional control valve 332 has a valve spool 342 whose position is controlled by the first solenoid-operated valve 101, while the flow control valve 334 has a valve spool 344 whose position is controlled by the second solenoid-operated valve 102. When the first and second solenoid-operated valves 101, 102 are both on, the valve spools 342, 344 of the valves 332, 334 are both placed in the upper positions, whereby the fluid in the first pressure line 144 is fed into the second hydraulic cylinder 82 through the directional control valve 332, a first connecting line 346, the flow control valve 334 and a second cylinder line 348, while the fluid in the first hydraulic cylinder 80 is discharged into the drain through a first cylinder line 350, the flow control valve 334, a second connecting line 352 and the directional control valve 332. Consequently, the CVT 16 is rapidly shifted down with the speed ratio "r" being increased to lower the vehicle speed. In this state, if the second solenoid-operated valve 102 is turned off while the first solenoid-operated valve 101 is held on, the valve spool 344 of the flow control valve 334 is moved to its lower position, whereby the fluid in the second pressure line 152 is fed into the second hydraulic cylinder 82 through a by-pass line 358 in which a check valve 354 and a flow restrictor 356 are disposed in parallel with each other. At the same time, the fluid in the first hydraulic cylinder 80 is discharged through a small clearance which is purposely formed or inherently left between the piston and the mating sliding surface of the cylinder 80. Consequently, the CVT 16 is slowly shifted down with the speed ratio "r" being slowly increased.

When the first solenoid-operated valve 101 is off while the second solenoid-operated valve 102 is on, the fluid in the first pressure line 144 is fed into the first hydraulic cylinder 80 through a relatively large flow restrictor 364, directional control valve 332, second connecting line 352, flow control valve 334 and first hydraulic line 350, while the fluid in the second hydraulic cylinder 82 is discharged to the second pressure line 152 through the second cylinder line 348, flow control valve 334, first connecting line 346 and directional control valve 332. Consequently, the CVT 16 is rapidly shifted up with the speed ratio "r" being reduced so as to increase the vehicle speed. In this state, if the second solenoid-operated valve 102 is turned off while the first solenoid-operated valve 101 is held off, the fluid in the first pressure line 144 is fed to the first hydraulic cylinder 80 through the directional control valve 332 and a third connecting line 362 equipped with a flow restrictor 360, while the fluid in the second hydraulic cylinder 82 is discharged to the second pressure line 152 through the by-pass line 358. Consequently, the CVT 16 is slowly shifted up with the speed ratio "r" being reduced. FIG. 8 indicates the relationship between on-off states of the first and second solenoid-operated valves 101, 102 and a shifting mode of the CVT 16, that is, the direction (shift-down or shift-up) and the rate (rapid or slow) of the shifting operation of the CVT 16. It is to be noted that the upper and lower positions of the directional and flow control valves 332, 334 are designated by "ON" and "OFF" in FIGS. 3 and 4, which correspond to the on-off states (also designated by "ON" and "OFF") of the corresponding first and second solenoid-operated valves 101, 102. Like the third and fourth solenoid-operated valves 103, 104, the first and second solenoid-operated valves 101, 102 are a three way switch valve having a ball-like spool, an inlet port connected to the pilot pressure line 337, an outlet port, and a drain port. When the solenoid-operated valve 101, 102 is placed in an energized position (ON), the inlet and outlet ports communicate with each other with the drain port closed by the ball-like spool, whereby the pilot pressure Ppilot is applied from the solenoid-operated valve 101, 102 to the corresponding control valve 332, 334. When the valve 101, 102 is placed in a non-energized position (OFF), the inlet port is closed by the ball-like spool while the outlet port communicates with the drain port.

The first cylinder line 350 is provided with a branch line 336, through which the pressure Pin in the first hydraulic cylinder 80 is applied to the chamber 217 of the first pressure regulating valve 146. In this valve 146, the first line pressure Pl1 is regulated based on the higher one of the second line pressure Pl2 and first cylinder pressure Pin, according to the equation (2) indicated above. Consequently, the first line pressure Pl1 is determined by adding an extra value α which is a minimum value required to establish the desired speed ratio "r" with a minimum power loss, in both cases where the pressure Pin in the first cylinder 80 is higher than the pressure Pout in the second cylinder 82 during a positive-torque running of the vehicle, and where the pressure Pout is higher than the Pressure Pin during an engine-brake running of the vehicle.

Referring to FIG. 2, the fluid discharged from the port 210c of the first pressure regulating valve 146 is fed into the lock-up pressure line 148, and directed to a lock-up pressure regulating valve 370 for producing a LOCK-UP CLUTCH pressure Pc1 suitable for operating the lock-up clutch 42 of the torque converter 12. The lock-up pressure regulating valve 370 has a valve spool 372 operated to regulate the pressure in the lock-up pressure line 148 by discharging the fluid from the line 148 into the return line 142; a spring 374 for biasing the spool 372 toward its closed position; and a plunger 378 having a large-diameter land 380 and a small-diameter land 382. The valve 370 further has a chamber 376 which receives as a feedback pressure the LOCK-UP CLUTCH pressure Pc1 which biases the spool 372 toward its open position, a chamber 384 formed between the lands 380, 382 of the plunger 378, for receiving the pilot pressure PsolL1 from the first linear solenoid valve 105 through the lock-up clutch control valve 416, and a chamber 386 which receives the THROTTLE pressure Pth so that the pressure Pth acts on the small-diameter land 382. The plunger 378 is adapted to produce a thrust based on the pilot pressure PsolL1 and the THROTTLE pressure Pth, so as to bias the spool 372 toward the closed position, to thereby increase the LOCK-UP CLUTCH pressure Pc1.

The hydraulic control circuit 100 of FIGS. 2–4 further includes a slip control valve 390 operated to regulate the pressure of the fluid which flows out of a releasing chamber 438 of the lock-up clutch 42 through the lock-up clutch control valve 416, so as to control slipping of the lock-up clutch 12. The slip control valve 390 has a valve spool 394 having a small-diameter and a large-diameter land 396 and 398; a chamber 392 formed adjacent to the small-diameter land 396, for receiving the pilot pressure PsolL1 from the first linear solenoid valve 105 through the lock-up clutch control valve 416; and a chamber 400 formed between the lands 396, 398 of the spool 394, for receiving the LOCK-UP CLUTCH pressure Pc1. The valve spool 394 is adapted to regulate the above-indicated pressure received from the releasing chamber 438 through the control valve 416, by connecting a line 393 for guiding this pressure, selectively to the lock-up pressure line 148 or the drain. The slip control valve 390 further has a spring 402 for biasing the spool 394 so as to lower the above-indicated pressure; a plunger 408 adapted to bias the spool 394 so as to lower the above-indicated pressure; and a chamber 410 formed between a large-diameter land 404 and a small-diameter land 406 of the plunger 408, for receiving the above-indicated pressure from the releasing chamber 438 of the lock-up clutch 42 through the control valve 416. In this slip control valve 390, the difference between the lock-up clutch pressure Pcl and the above-indicated pressure is adjusted by the pilot pressure PsolL1 applied from the first linear solenoid valve 105, so as to control the amount of slipping of the lock-up clutch 42 upon engagement of the clutch 42.

The lock-up clutch control valve 416 is actuated by the third solenoid-operated valve 103 for selectively engaging or releasing the lock-up clutch 42. This valve 416 includes a pair of valve spools 418a, 418b which are coaxially disposed in contact with each other, and which have an engaging or upper position as indicated at "ON" in FIG. 2 and a releasing or lower position as indicated at "OFF". The valve 416 further includes: a spring 420 for biasing these spools 418a, 418b toward the releasing position; a chamber 424 accommodating the spring 420 and receiving the REVERSE-POSITION pressure PR from the line 422, which produces a thrust for moving the spools 418a, 418b toward the releasing position; and a chamber 426 adapted to receive through the third solenoid-operated valve 103 the pilot pressure Ppilot which produces a thrust for moving the spools 418a, 418b toward the engaging position. When the third solenoid-operated valve 103 is turned off so that the chamber 426 is exposed to the atmosphere, the spools 418a, 418b are moved downward to the releasing position under the biasing action of the spring 420. In this releasing position, an inlet port 428 and a releasing port 430 of the valve 416 communicate with each other, so that the fluid (having the LOCK-UP CLUTCH pressure Pcl) in the lock-up pressure line 148 is fed to the releasing chamber 438 of the lock-up clutch 42, through a check valve 432, the inlet port 428, the releasing port 430 and a releasing line 436. At the same time, the fluid in an engaging chamber 440 of the lock-up clutch 42 is discharged into the drain through an engaging line 442, an engaging port 444, a first discharge port 446 and an oil cooler 448. On the upstream side of the oil cooler 448, there is provided a relief type cooler pressure control valve 450 for controlling the pressure of the fluid to be fed into the cooler 448, so that the pressure does not exceed a predetermined level.

With the valve spools 418a, 418b placed in the releasing position, a signal input port 452 communicates with a releasing signal output port 454, whereby the pilot pressure PsolL1 received from the first linear solenoid valve 105 is applied to the chamber 384 of the lock-up pressure regulating valve 370 and the pilot pressure regulating valve 336, through the signal input port 452, releasing signal output port 454 and a releasing signal line 456. Consequently, the LOCK-UP CLUTCH pressure Pcl is increased when the lock-up clutch 42 is released, so as to effect rapid releasing of the clutch 42. At the same time, the back pressures of the accumulators 320, 322 are regulated by the pilot pressure Ppilot which is changed upon engagement of the FORWARD clutch 62 or REVERSE brake 64, so that the frictionally coupling devices of the clutch 62 and brake 64 may be smoothly engaged.

In the lock-up clutch control valve 416 wherein the valve spools 418a, 418b are placed in the releasing position, a first port 458 which is connected to the line 226 for the THROTTLE pressure Pth is disconnected from a second port 462 which is connected to the chamber 254 of the throttle sensing valve 228 through the line 460, while at the same time the second port 462 communicates with a drain port 464. In the throttle sensing valve 228, therefore, a thrust based on the feedback pressure for lowering the THROTTLE pressure Pth is reduced. Consequently, the THROTTLE pressure Pth is increased when the lock-up clutch 12 is released.

When the third solenoid-operated valve 103 is turned on so that the pilot pressure Ppilot is applied to the chamber 426 of the lock-up clutch control valve 416, the spools 418a, 418b indicated above are moved upward to the engaging position against the biasing force of the spring 420. In this engaging position, the inlet port 428 communicates with an engaging port 444, whereby the fluid in the lock-up pressure line 148 is supplied to the engaging chamber 440 of the lock-up clutch 42 through the check valve 432, inlet port 428, engaging port 444 and engaging line 442. At the same time, the fluid in the releasing chamber 438 of the lock-up clutch 42 is discharged into the drain through the releasing line 436, releasing port 430, second discharge port 470 and the above-described slip control valve 390. When the chamber 424 accommodating the spring 420 receives the REVERSE-POSITION pressure $P_R$, the spools 418a and 418b are moved down to the releasing position as described above, irrespective of the operating state (on or off state) of the third solenoid-operated valve 103. Accordingly, the lock-up clutch 42 is maintained in the released position when the shift lever 126 is placed in the REVERSE position "R", that is, when the vehicle is running in the reverse direction.

When the valve spools 418a, 418b of the lock-up clutch control valve 416 are placed in the engaged position, the signal input port 452 communicates with an engaging signal output port 466, whereby the pilot pressure PsolL1 from the first linear solenoid valve 105 is applied to the chamber 392 of the slip control valve 390 and the chamber 190 of the second pressure regulating valve 150, through the signal input port 452, engaging signal output port 466 and an engaging signal line 468. In this arrangement, the slip control valve 390 is actuated to control slipping of the lock-up clutch 42 when the clutch 42 is engaged.

With the lock-up control valve 416 placed in the engaging position, the first port 458 connected to the line 226 for the THROTTLE pressure Pth communicates with the second port 462 connected through the line 460 to the chamber 254 of the throttle sensing valve 228 while the drain port 464 is closed, whereby a thrust based on the feedback pressure for lowering the THROTTLE pressure Pth is increased in the throttle sensing valve 228. Consequently, the THROTTLE pressure Pth is lowered when the lock-up clutch 42 is engaged.

Figure 9:
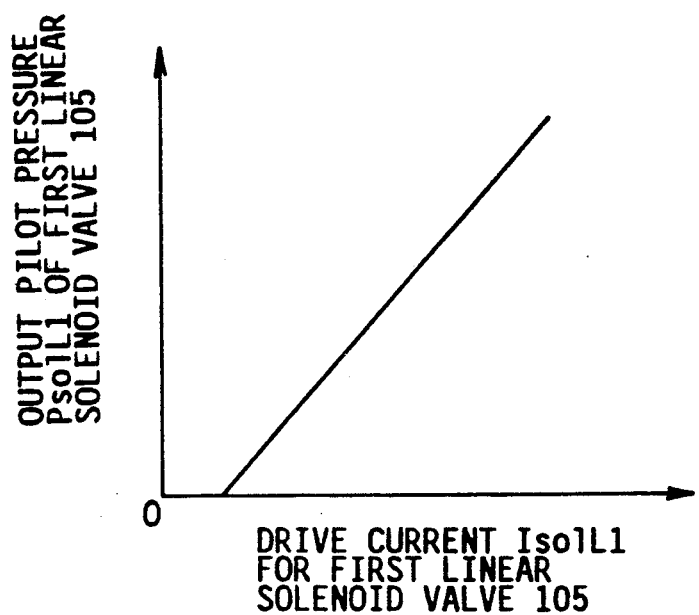
FIG. 9 is a graph showing an output characteristic of a first linear solenoid valve incorporated in the apparatus of FIGS. 2

The first linear solenoid valve 105 produces the pilot pressure PsolL1 by reducing the pilot pressure Ppilot. The valve 105 includes: a valve spool 482; a spring 480 for biasing the spool 482 toward its closed position; a chamber 484 which receives the pilot pressure PsolL1 as a feedback pressure acting on the spool 482; a linear solenoid coil 488 which is energized by a drive signal received from the electronic control device 110; and a core 486 which produces a continuously varying thrust to bias the spool 482 toward its open position, upon energization of the coil 488. The pilot pressure PsolL1 generated by this valve 105 is continuously increased with an increase in the magnitude of the drive signal (i.e., a drive current IsolL1) applied to the solenoid coil 488, as indicated in the graph of FIG. 9. Namely, the pilot pressure PsolL1 is regulated according to the following equation (5):

$$PsolL1 = (FL1 - WL1)/AL1 \quad (5)$$

where, $W_{L1}$: biasing force of the spring 480
$A_{L1}$: pressure-receiving area of the valve spool 482
$F_{L1}$: thrust force by the core 486

Figure 10:
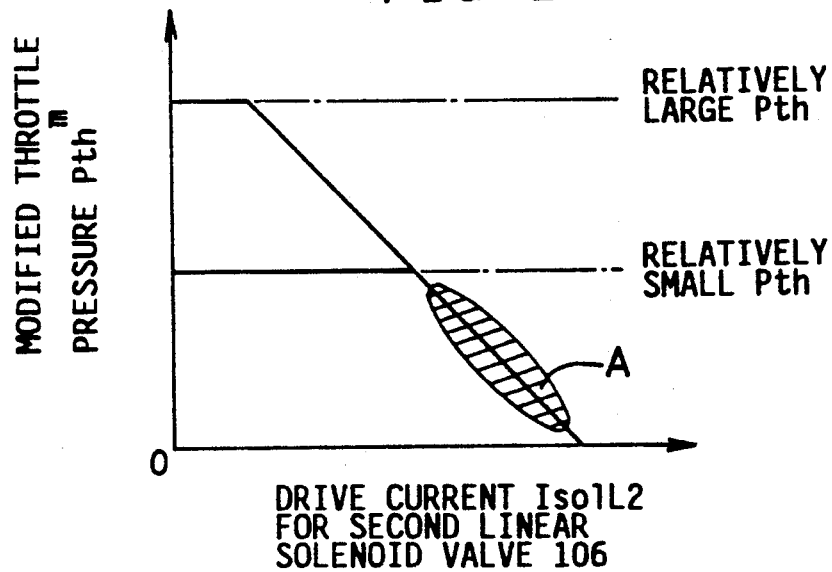
FIG. 10 is a graph indicating an output characteristic of a second linear solenoid valve incorporated in the apparatus of FIGS. 2-4.

The second linear solenoid valve 106 produces the modified THROTTLE pressure $Pth^m$ by reducing the THROTTLE pressure Pth. This valve 106 includes: a valve spool 492; a spring 490 for biasing the spool 492 toward its open position; a chamber 494 which receives the modified THROTTLE pressure $Pth^m$ as a feedback pressure acting on the spool 492; a linear solenoid coil 498 which is energized by the drive signal received from the electronic control device 110; and a core 496 which produces a continuously varying thrust to bias the spool 492 toward its closed position, upon energization of the coil 498. The modified THROTTLE pressure $Pth^m$ generated by this valve 106 is continuously lowered with an increase in the magnitude of the drive signal (i.e., a drive current IsolL2) applied to the solenoid coil 498, as indicated in the graph of FIG. 10. Namely, the modified THROTTLE pressure $Pth^m$ is regulated according to the following equation (6):

$$Pth^m = (W_{L2} - F_{L2})/A_{L2} \quad (6)$$

where, $W_{L2}$: biasing force of the spring 490
$A_{L2}$: pressure-regulating area of the valve spool 492
$F_{L2}$: thrust force by the core 496

The thus regulated modified THROTTLE pressure $Pth^m$ is applied to the chamber 182 of the second regulating valve 150, through the relay valve 500 and a line 502.

The relay valve 500 includes: a valve spool 504 which is selectively placed in an OFF position for supplying the line 502 with the modified THROTTLE pressure $Pth^m$, and an ON position for supplying the line 502 with the THROTTLE pressure Pth; a chamber 506 which receives the pilot pressure Ppilot through the fourth solenoid-operated valve 104 to produce a thrust for biasing the spool 504 toward the ON position; and a spring 508 for biasing the spool 504 toward the OFF position. When the fourth solenoid-operated valve 104 is off, the spool 504 is placed in the OFF position under the biasing action of the spring 508, so that the modified THROTTLE pressure $Pth^m$ is applied to the line 502. When the fourth solenoid-operated valve 104 is on, the spool 504 is placed in the ON position based on the pilot pressure Ppilot, so that the THROTTLE pressure Pth is applied to the line 502. In this condition, the pilot pressure Ppilot received from the fourth solenoid-operated valve 104 is also applied to the chamber 510 of the directional control valve 332, so that the valve 332 is placed in a slow shift-down mode in which the CVT 16 is slowly shifted down with the speed ratio "r" being slowly increased. Namely, when the pilot pressure Ppilot is applied to the chamber 510, a plunger 512 of the valve 330 is moved upward by a thrust due to the pilot pressure Ppilot, so as to place the valve spool 342 in the upper or shift-down position. The fourth solenoid-operated valve 104 is turned on when a trouble with the second linear solenoid valve 106 is found, so that the second line pressure Pl2 is regulated into a predetermined basic pressure Pmec, based on the THROTTLE pressure Pth. The valve 104 is also turned on so as to establish the above-indicated slow shift-down mode when the control device 110 fails to effect proper control of the speed ratio "r" of the CVT 16. To find a trouble with the second linear solenoid valve 106, a pressure sensor 518 for detecting the actual modified THROTTLE pressure $Pth^m$ is provided in a line connecting the valve 106 and the relay valve 500.

The electronic control device 110 operates to control the speed ratio "r" of the CVT 16 to the optimum value depending upon the running condition of the vehicle, and effect other control operations as indicated in the table of FIG. 11, such as the operation to regulate the second line pressure Pl2 for maintaining the tension of the belt 70 at the optimum level, depending upon the received torque and speed ratio "r" of the CVT 16. In controlling the CVT 16, the control device 110 calculates a desired or target speed Nin* of the input shaft 44 from the currently detected throttle opening angle $\theta$th and running speed SPD of the vehicle, according to a predetermined relationship among the parameters Nin*, $\theta$th and SPD, which is stored in the ROM 114. This relationship is determined for minimum fuel consumption by the engine 10 and maximum drivability of the vehicle. The control device 110 selects one of the modes of the CVT 16 indicated in FIG. 8 to operate the CVT 16 so that the actual speed Nin of the input shaft 44 coincides with the determined desired value Nin*. Depending upon the selected mode of the CVT 16, the first and second solenoid-operated valves 101 and 102 are controlled so as to adjust the speed ratio "r" of the CVT 16 to the optimum value. The above-indicated relationship among the parameters Nin*, $\theta$th and SPD is selected from a plurality of stored relationships which correspond to respective driving positions (LOW "L", SECOND "S", DRIVE "D" and REVERSE "R") of the shift lever 126.

When the vehicle is stopped with the shift lever 126 being placed in the NEUTRAL position "N", the electronic control device 110 selects "A" mode from hydraulic control modes "A" through "H" as indicated in the table of FIG. 11, in which mode the third and fourth solenoid-operated valves 103, 104, and the first and second linear solenoid valves 105, 106 are OFF. When the vehicle is started with the shift lever 126 being operated to a selected one of the driving positions such as the DRIVE and REVERSE positions, the control device 110 selects "B" mode as indicated in FIG. 11, to control or regulate the back pressures of the accumulators 320, 322 for the FORWARD clutch 62 and the REVERSE brake 64. In this mode, the pilot pressure PsolL1 generated by the first linear solenoid valve 105 is applied to the chamber of the pilot pressure regulating valve 336. Accordingly, the pilot pressure Ppilot is changed so as to change the back pressures of the accumulators 320, 322 at a rate suitably determined as a function of time stored in the ROM 114, so that the torque for driving the drive wheels of the vehicle is smoothly or continuously varied during an initial period of the engaging actions of the clutch and brake 62, 64. In this arrangement, the engaging shocks of the clutch 62 and brake 64 are effectively reduced. After the vehicle starts running in this manner, the third solenoid-operated valve 103 is selectively operated to the ON or OFF position, according to a predetermined relationship among the parameters such as the actual vehicle speed SPD and the currently detected throttle opening angle θth, so that the lock-up clutch 42 is placed in the engaged or released position.

Figure 12:
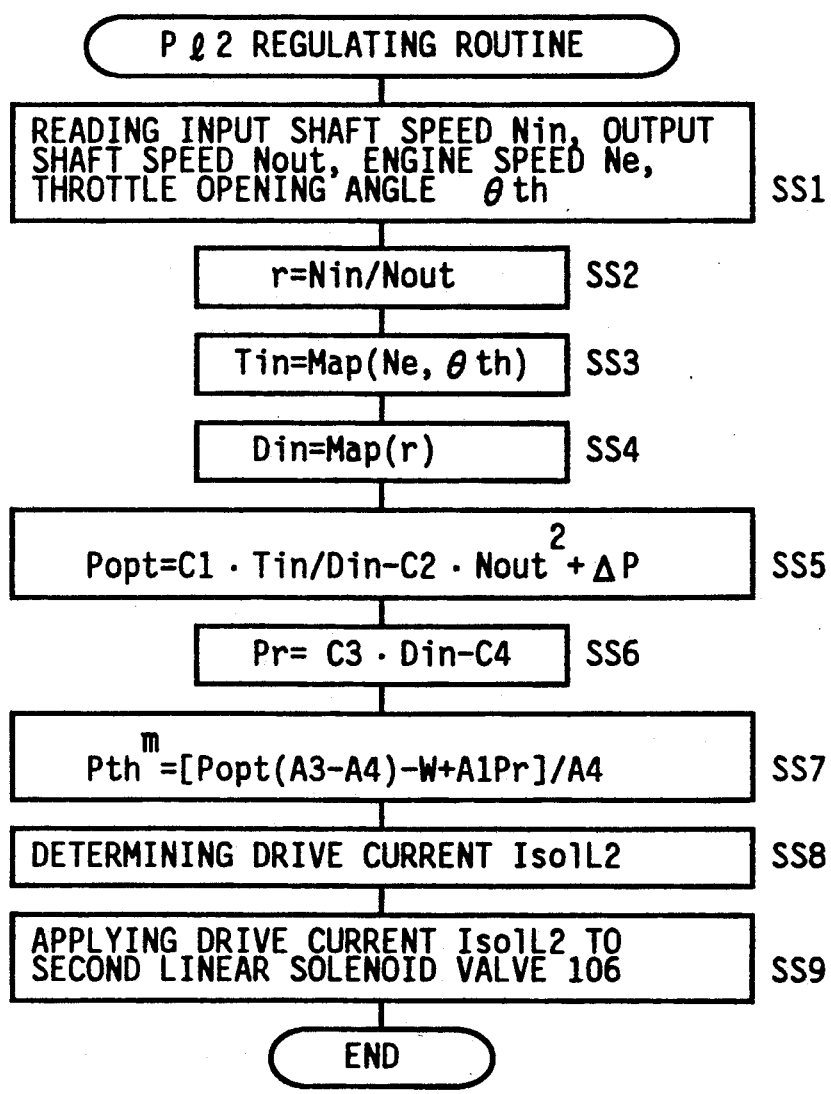
FIG. 12 is a flow chart illustrating a second line pressure regulating routine implemented by an electronic control device used for the hydraulic control apparatus of FIGS. 2-4.

The tension of the belt 70 is controlled by execution of a second line pressure regulating routine illustrated in the flow chart of FIG. 12 when the electronic control device 110 selects "C" or "G" mode as indicated in FIG. 11. This routine is executed irrespective of the on-off state of the third solenoid-operated valve 103 while the shift lever 126 is placed in one of the driving positions indicated above.

Figure 13:
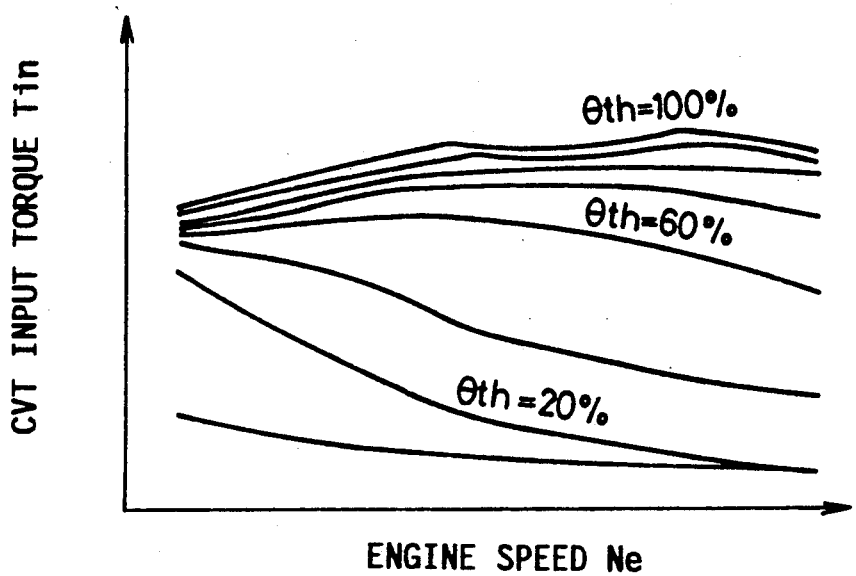
FIG. 13 is a graph indicating a relationship stored in the electronic control device, among the engine speed, opening angle θth of a throttle valve and input torque of the CVT, for obtaining an optimum second line pressure.

Initially, step SS1 is implemented to read various parameters of the vehicle, such as the speed Nin of the input shaft 44, the speed Nout of the output shaft 45, engine speed Ne and throttle opening angle θth. Step SS1 is followed by step SS2 to calculate the current speed ratio "r" of the CVT 16, based on the currently detected speeds Nin, Nout of the input and output shafts 44, 45, according to a predetermined relationship (i.e., "r" Nin/Nout). Then, the control flow goes to step SS3 to calculate an output torque of the engine 10, that is, an input torque Tin of the CVT 16, based on the engine speed Ne and the throttle opening angle θth, according to a predetermined relationship among these parameters Tin, Ne and θth, as indicated in FIG. 13.

Figure 14:
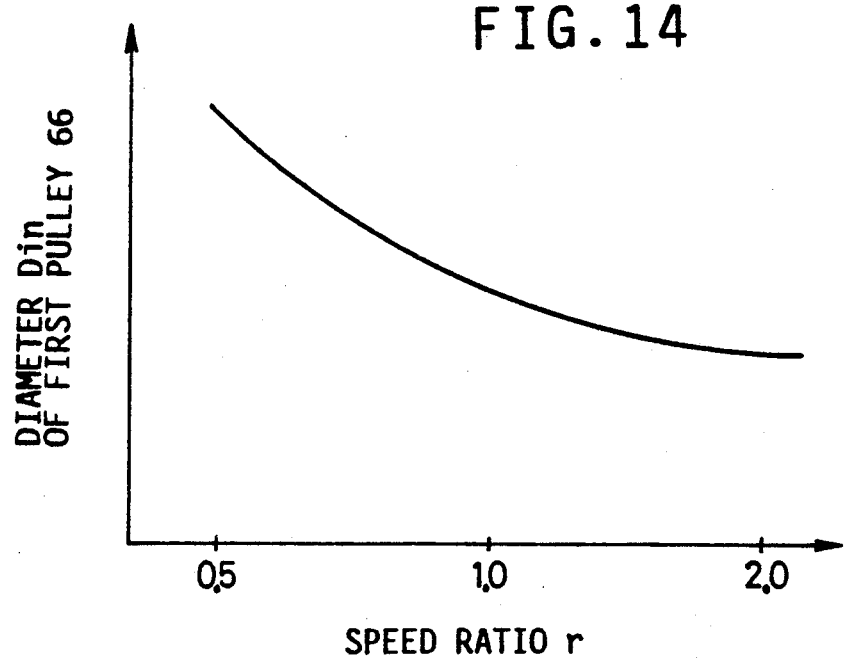
FIG. 14 is a graph indicating a relationship stored in the electronic control device, between the CVT speed ratio and the effective diameter of a variable-diameter pulley provided on an input shaft of the CVT.

The control flow then goes to step SS4 to calculate the effective diameter Din of the first variable-diameter pulley 66 mounted on the input shaft 44, that is, the diameter Din engaging the transmission belt 70, based on the current speed ratio "r", according to a predetermined relationship among these parameters Din and "r", as indicated in FIG. 14. Step SS4 is followed by step SS5 to calculate the optimum pressure Popt, based on the actual input torque Tin of the CVT 16, the actual diameter Din engaging the belt 70, and the speed Nout of the output shaft 45, according to a predetermined stored relationship as represented by the following equation (7). The pressure Popt should be interpreted to mean a theoretically optimum pressure which is applied to the second hydraulic cylinder 82 in order that the CVT 16 can transmit the input torque without slipping of the belt 70 on the pulleys 66, 68. In the following equation (7), the second term of the right side is meant to compensate for the centrifugal pressure, and the third term (ΔP) of the right side is an extra value.

$$Popt = C1 \cdot Tin/Din - C2 \cdot Nout^2 + \Delta P \quad (7)$$

where,
C1: constant
C2: constant

The control flow then goes to step SS6 to calculate the SPEED-RATIO pressure Pr corresponding to the current speed ratio "r" of the CVT 16, based on the diameter Din engaging the belt 70, according to a predetermined stored relationship as represented by the following equation (8):

$$Pr = C3 \cdot Din - C4 \quad (8)$$

where,
C3: constant
C4: constant

Step SS6 is followed by step SS7 to calculate a modified THROTTLE pressure $Pth^m$, according to a predetermined stored relationship as represented by the following equation (9). This equation (9) is obtained by replacing the left side (Pl2) of the equation (1) with the optimum pressure Popt which has been calculated in step SS5.

$$Pth^m = [Popt(A3 - A2) - W + A1 \cdot Pr]/A4 \quad (9)$$

Then, the control flow goes to step SS8 to calculate a required drive current IsolL2 for actuating the second linear solenoid valve 106 so as to generate the calculated modified THROTTLE pressure $Pth^m$, according to the above-indicated predetermined relationship as indicated in FIG. 10. Step SS8 is followed by step SS9 to apply the calculated drive current IsolL2 to the valve 106. The above steps SS1–SS9 are repeatedly executed so as to raise the second line pressure Pl2 from the first basic output pressure Pmec1, until the pressure Pl2 coincides with the optimum pressure Popt indicated above.

As the vehicle speed SPD is increased, the third solenoid-operated valve 103 and the lock-up clutch control valve 416 are brought to the ON position, to place the lock-up clutch 42 in the engaged position. Immediately after the engagement of the clutch 42 is initiated, the control device 110 selects "F" mode as indicated in FIG. 11, so as to control the amount of slipping of the clutch 42 for a given period of time. Upon completion of the slip control for the clutch 42, the control device 110 selects "G" mode as indicated in FIG. 11. In the "F" mode indicated above, the pilot pressure PsolL1 generated by the first linear solenoid valve 105 is applied to the chamber 392 of the slip control valve 390 as well as the chamber 190 of the second pressure regulating valve 150. Consequently, the second line pressure Pl2 is maintained at an elevated level until the lock-up clutch 42 is fully engaged, so as to avoid slipping of the belt 70 due to the torque amplifying operation of the torque converter 12, while a difference between the LOCK-UP CLUTCH pressure Pcl and the pressure received from the releasing chamber 438 of the lock-up clutch 42 is controlled by the pilot pressure PsolL1, so as to control the amount of slipping of the lock-up clutch 42 to achieve smooth engagement of the clutch 42. In this state, the level of the output signal pressure PsolL1 corresponds to the degree of slipping of the lock-up clutch 42. Therefore, the pressure PsolL1 is reduced as a predetermined function of time so that the lock-up clutch 42 is smoothly engaged, or the pressure PsolL1 is maintained at a given level as needed while the vehicle is running at a speed just before the engagement of the clutch 42.

When the lock-up clutch control valve 416 is ON, the THROTTLE pressure Pth is applied to the chamber 254 of the throttle sensing valve 228, whereby the pressure Pth is lowered compared to that generated when the lock-up clutch 42 is placed in the released position. Since the first and second line pressures Pl1 and Pl2 are lowered with the thus lowered THROTTLE pressure Pth, the torque converter 12 can be operated in its coupling state with a minimum power loss. In this arrangement, it is not necessary to provide a cutback valve for changing the THROTTLE pressure Pth so as to lower the line pressures Pl1, Pl2 in the coupling state of the torque converter 12. Thus, the hydraulic system of the present embodiment is simplified in the absence of such a cutback valve, assuring improved operating reliability.

If a brake is applied while the vehicle is running with the lock-up clutch 42 being engaged, the vehicle speed SPD is lowered, and the third solenoid-operated valve 103 is turned off. In this case, the control device 110 selects "B" mode as indicated in FIG. 11, so that the pilot pressure PsolL1 of the first linear solenoid valve 105 is applied to the chamber 384 of the lock-up pressure regulating valve 370, whereby the LOCK-UP CLUTCH pressure Pc1 is increased to a predetermined level which corresponds to the level of the applied pressure PsolL1. Consequently, the pressure applied to the releasing chamber 438 of the lock-up clutch 42 is increased with the increase in the LOCK-UP CLUTCH pressure Pc1 (the output signal pressure PsolL1), whereby the lock-up clutch 42 is rapidly released.

Figure 15:
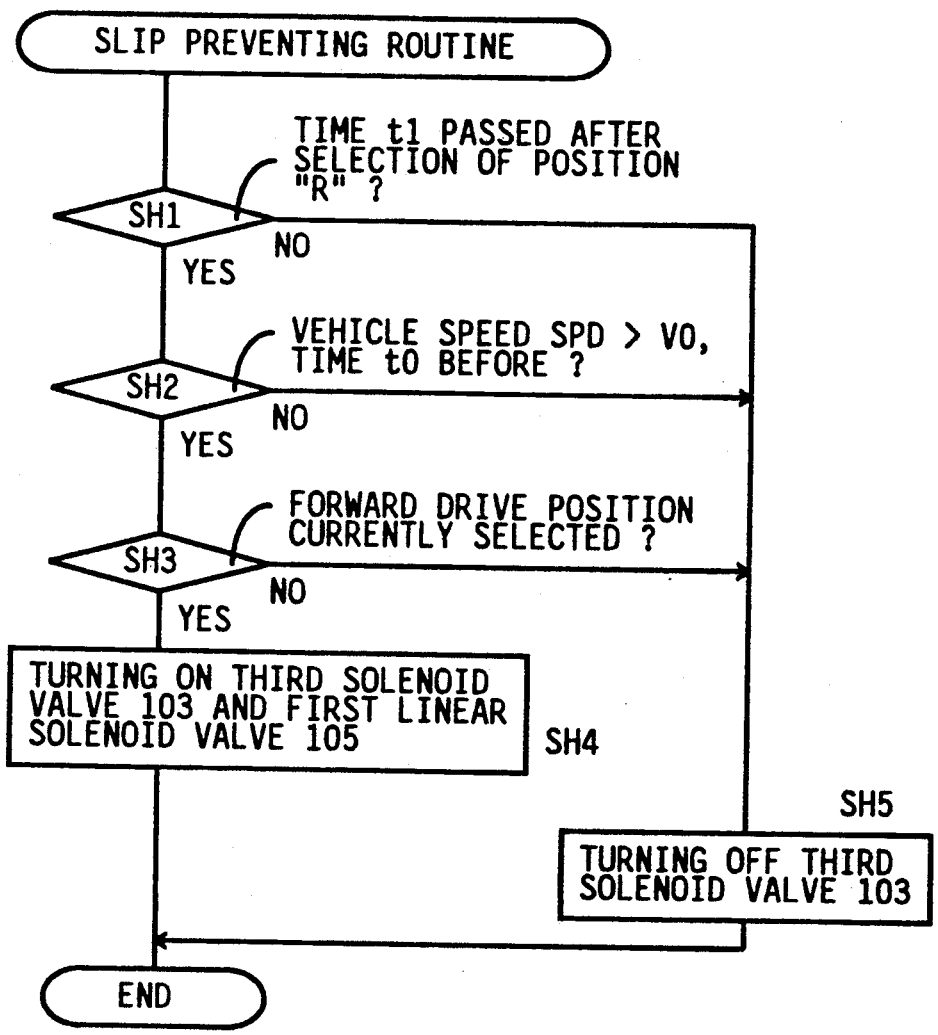
FIG. 15 is a flow chart explaining an operation for preventing slipping of the belt when the direction of rotation of variable-diameter pulleys is reversed in the power of FIG. 1.

The direction of rotation of the variable-diameter pulleys 66, 68 is reversed when the shift lever 126 is operated to one of the forward drive positions (i.e., "L", "S" and "D") while the vehicle is running in the reverse direction, for example. With the pulleys 66, 68 being rotated in the reverse direction, the number of the blocks of the belt 70 which contribute to power transmission is temporarily reduced for a given period of time, whereby an apparent frictional force between the belt 70 and the pulleys 66, 68 is reduced, giving rise to a risk of slipping of the belt 70 on the pulleys 66, 68. To deal with this problem, the electronic control device 110 of the present embodiment executes a slip preventing routine illustrated in the flow chart of FIG. 15, in which the second line pressure Pl2 is temporarily increased so as to avoid the slipping of the belt 70 on the pulleys 66, 68. Initially, step SH1 is implemented to determine whether a predetermined time t1 has passed after the shift lever 126 was placed in the REVERSE position "R". Then, step SH2 is implemented to determine whether the vehicle speed SPD detected the time t1 before was higher than a predetermined reference value V0 or not. Step SH2 is followed by step SH3 to determine whether the shift lever 126 is currently placed in any one of the forward drive positions ("L", "S" and "D"). The above-indicated t1 time is determined to be slightly larger than a delay time from the time when the shift lever 126 is operated to the forward drive position to the time when the output shaft of the reversing device 14 is actually reversed. For example, the time t1 is held in a range from several hundreds of milliseconds to one second. The above-indicated reference value V0 is the lower limit of a range of the vehicle speed SPD in which the belt 70 significantly suffers from reduction in the apparent frictional force upon reversal of the rotating direction of the pulleys 66, 68. For example, the reference value V0 is selected within a range of about 10–20 km per hour. When the vehicle speed SPD is lower than the reference value V0, the load torque applied to the belt 70 due to the inertia of the vehicle is too small to cause slipping of the belt 70.

If affirmative decisions (YES) are obtained in all of the above steps SH1, SH2 and SH3, the control flow goes to step SH4 in which the third solenoid-operated valve 103 and the first linear solenoid valve 105 are placed in the ON position to raise the pilot pressure PsolL1 to its maximum level. As a result, the control device 110 selects "D" mode as indicated in FIG. 11, wherein the maximum pilot pressure PsolL1 is applied to the chamber 392 of the slip control valve 390 so as to prevent the fluid flowing out of the releasing chamber 438 from being released into the drain. At the same time, the maximum pilot pressure PsolL1 is also applied to the chamber 190 of the second pressure regulating valve 150 to raise the second line pressure P(2 according to the following equation (10), so as to avoid the slipping of the belt 70 when the rotating direction of the pulleys 66, 68 is reversed. If a negative decision (NO) is obtained in any one of the above steps SH1, SH2 and SH3, on the other hand, the control flow goes to step SH5 to place the third solenoid-operated valve 103 in the OFF position, so as to permit the control device 110 to perform other control operations, such as the back pressure control operation for the accumulators 320, 322. With the above steps SH1-SH5 repeatedly executed, the second line pressure Pl2 is raised for the time duration t1 to avoid slipping of the belt 70 on the pulleys 66, 68, when the shift lever 126 is operated to the forward drive position "L", "S" or "D" while the vehicle is running in the reverse direction.

$$Pl2 = [A4 \cdot Pth^m + (A4' - A4)PsolL1 + W - A1 \cdot Pr]/(A3 - A2) \quad (10)$$

Figure 16:
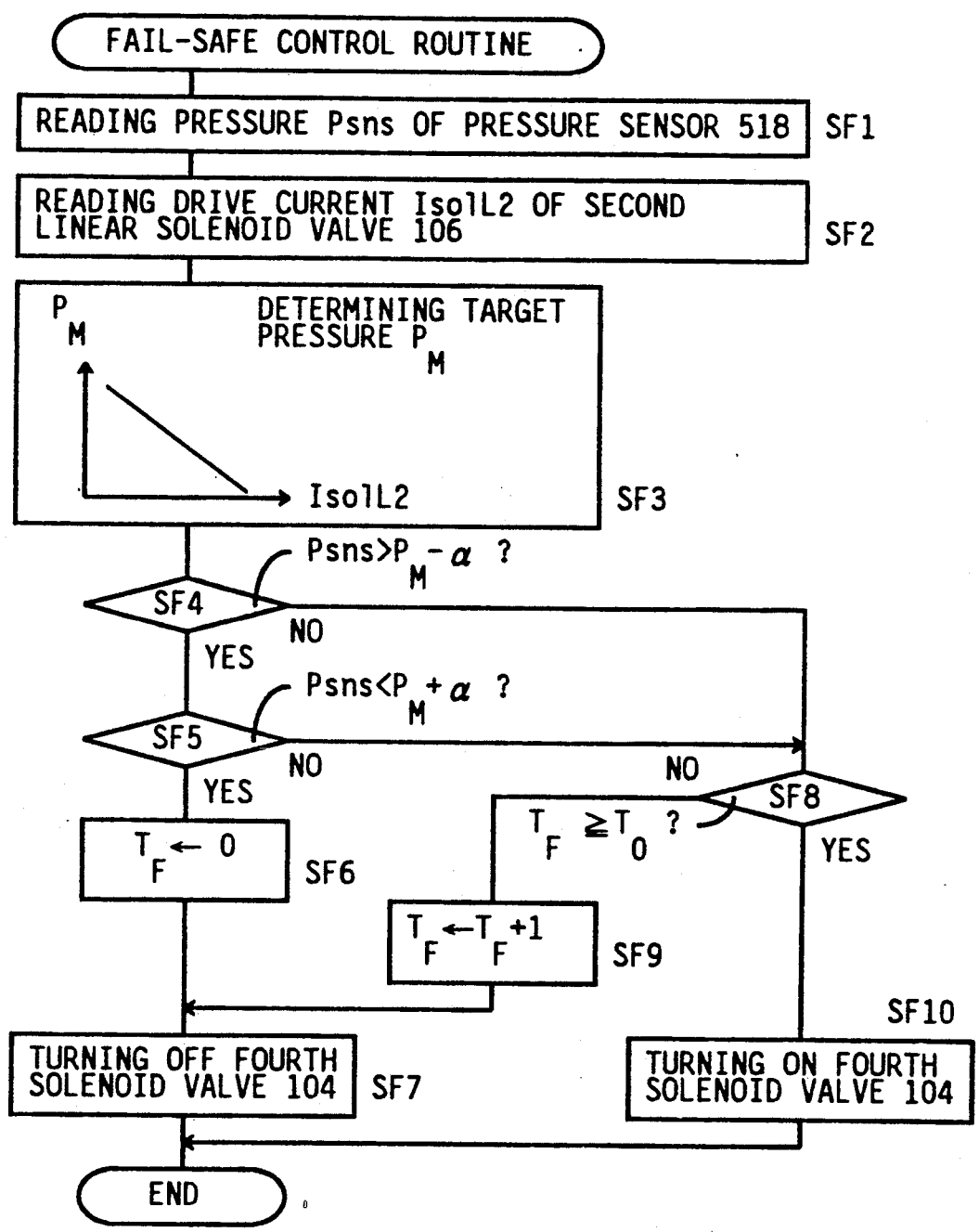
FIG. 16 is a flow chart illustrating a fail-safe control routine for dealing with a trouble with the second linear solenoid valve of the apparatus of FIGS. 2-4.

The electronic control device 110 further performs a fail-safe control routine illustrated in the flow chart of FIG. 16, so as to as deal with a trouble with the second linear solenoid valve 106 used for executing the second pressure regulating routine as illustrated in FIG. 12. Initially, step SF1 is implemented to read a detected pressure Psns (the current modified THROTTLE pressure $Pth^m$) based on an output signal from the PRESSURE sensor 518. In the next step SF2, the drive current IsolL2 being applied to the second linear solenoid valve 106 is detected by a drive current detecting circuit provided in a drive circuit of the control device 110. Alternatively, the drive current IsolL2 may be detected based on a command signal generated by the CPU 112 for applying the current to the drive circuit. Step SF2 is followed by step SF3 to determine a desired or target value $P_M$ for the modified THROTTLE pressure $Pth^m$, which should be generated in the normal state of the vehicle, based on the drive current IsolL2, according to the relationship as indicated in the graph of FIG. 10.

The control flow then goes to step SF4 and step SF5 to determined whether the detected pressure Psns is held in a permissible range around the determined target value $P_M$, that is, in a range from $(P_M - \alpha)$ to $(P_M - \alpha)$ where "$\alpha$" is a predetermined value of tolerance. More specifically, step SF4 is implemented to determined whether the pressure Psns is larger than the permissible lowest level $(PM - \alpha)$, and step SF5 is implemented to determined whether the pressure Psns is smaller than the permissible highest value $(PM + \alpha)$. The above-indicated tolerance value "$\alpha$" is a reference value for determining whether the output of the second linear solenoid valve 106 is abnormal or not, and is set to be larger than an estimated variation in the output of the linear solenoid-operated valve 106 used for individual vehicles. When the detected pressure Psns is held in the permissible range indicated above, affirmative decisions (YES) are obtained in steps SF4 and SF5, and the control flow goes to step SF6 to set the content of a time counter $T_F$ to zero, and to step SF7 to turn off the fourth solenoid-operated valve 104. Thus, one cycle of the present fail-safe control routine is terminated, and the above steps following step SF1 are repeatedly executed.

When the detected pressure Psns is outside the permissible range indicated above, i.e., when the second linear solenoid valve 106 operates with some trouble, a negative decision (no) is obtained in any one of the above steps SF4 and SF5, and the control flow goes to step SF8 to determine whether the content of the time counter $T_F$ reaches a predetermined reference value T0 (e.g., several seconds). The reference value T0 is determined to permit the control device 110 to surely detect a trouble with the operation of the valve 106, while avoiding any possible misjudgement due to a transient change in the pressure in the hydraulic system. Since the content of the time counter $T_F$ has not reached the reference value To at first, a negative decision (NO) is obtained in step SF8, and the control flow goes to step SF9 to add a given value "1" to the content of the time counter $T_F$. Then, step SF7 and subsequent steps are executed.

When an affirmative decision (YES) is obtained in step SF8 while the above steps are repeatedly executed, the control flow goes to step SF10 to turn on the fourth solenoid-operated valve 104, whereby the control device 110 selects "H" mode as indicated in FIG. 11. In this mode, the line 502 which has been connected to the second linear solenoid valve 106 is now connected to the line 226 by means of the relay valve 500, whereby the THROTTLE pressure Pth in the line 226 is applied to the chamber 182 of the second pressure regulating valve 150, in place of the modified THROTTLE pressure $Pth^m$ generated by the valve 106. As a result, the second line pressure P(2 regulated according to the above-indicated equation (1) is made equal to the second basic output pressure Pmec2. Thus, even if the second linear solenoid valve 106 operates with some trouble, the second line pressure Pl2 is at least regulated based on the SPEED-RATIO pressure Pr and the throttle opening angle θth, to avoid slipping of the belt 70 on the pulleys 66, 68. In this "H" mode, the directional control valve 332 of the shift control valve assembly 330 is forced to be placed in the slow shift-down mode, so that the CVT 16 is slowly shifted down to lower the vehicle speed. In this manner, the operator of the vehicle is notified of the trouble with the second linear solenoid valve 106, which should be repaired.

Figure 17:
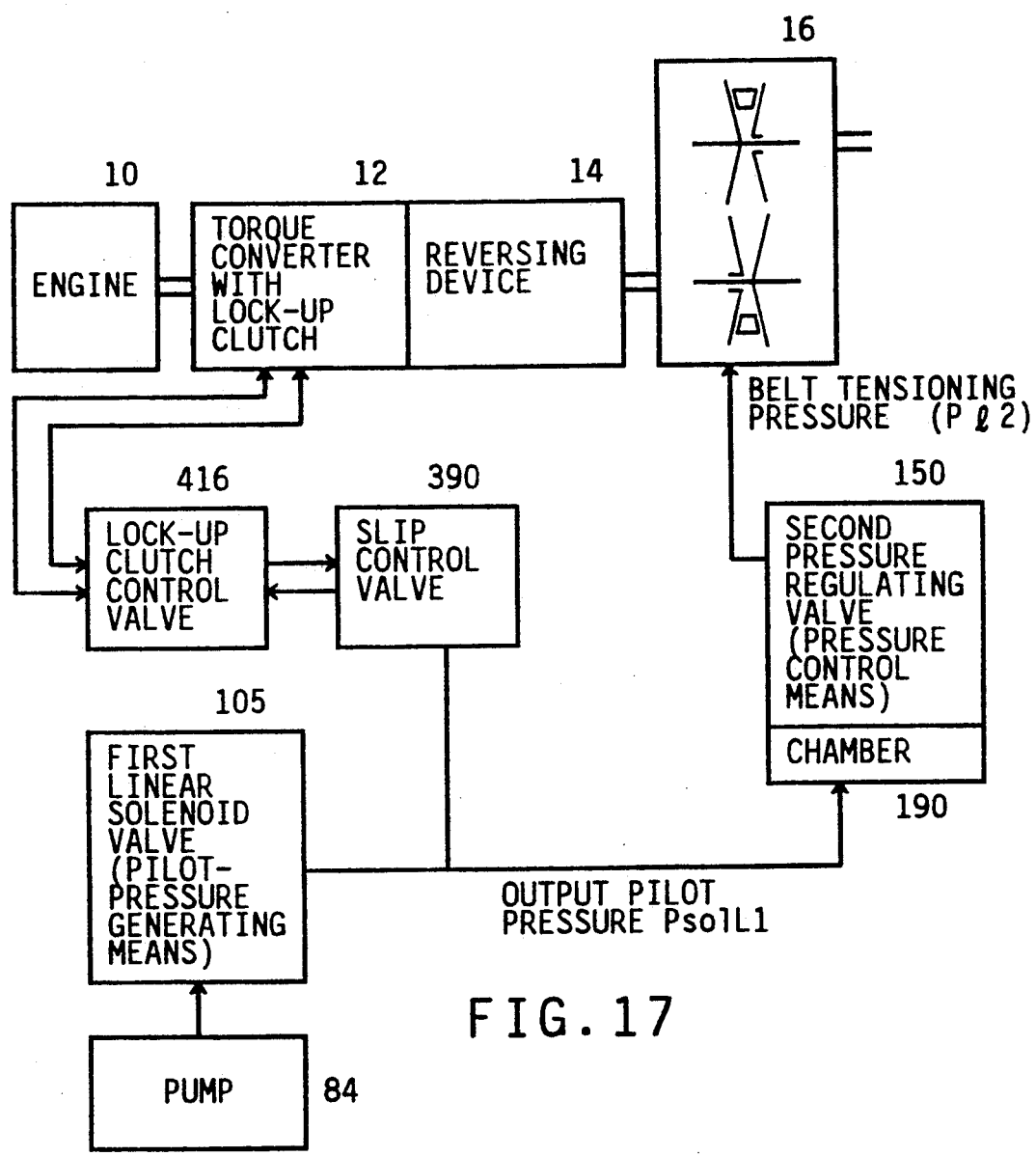
FIG. 17 is a schematic view showing principal elements of the hydraulic control apparatus of FIGS. 2-4, according to the principle of the present invention.

Referring to FIG. 17 schematically showing principal elements of the hydraulic control apparatus of the instant embodiment, when the third solenoid-operated valve 103 is turned ON to place the lock-up clutch control valve 416 in a position for engaging the lock-up clutch 42, the pilot pressure PsolL1 generated by the first linear solenoid valve 105 is applied for a given period of time to the slip control valve 390 and the chamber 190 of the second pressure regulating valve 150, so as to control the amount of slipping of the lock-up clutch 24 while at the same time raising the second line pressure Pl2, i.e., a belt tensioning pressure for controlling the tension of the transmission belt 70. Thus, the second pressure regulating valve 150 serves as pressure control means for raising the belt tensioning pressure, and the first linear solenoid valve 105 serves as pilot-pressure generating means for generating the pilot pressure PsolL1 for simultaneously implementing the slip control operation for the lock-up clutch 24 and pressure raising operation for the valve 150. Whenever the slip control operation for the lock-up clutch 42 is effected upon engagement of the clutch 42, therefore, the pilot pressure PsolL1 is applied from the first linear solenoid valve 105 to the second pressure regulating valve 150, so that the second line pressure Pl2 as the belt tensioning pressure is raised by a predetermined level. Thus, the belt tensioning pressure is surely raised so as to increase the torque capacity of the CVT 16, during a period from a moment at which the lock-up clutch control valve 42 is placed in the engaging position (the third solenoid-operated valve 103 is turned ON), to a moment at which the clutch 42 is fully engaged, that is, during the slip control operation for the clutch 42. With the torque capacity thus increased, the belt 70 of the CVT 16 is prevented from slipping on the pulleys 66, 68, in spite of the torque amplifying operation of the torque converter 12 and an inertia torque upon engagement of the clutch 42.

In the instant embodiment, the pilot pressure PsolL1 is utilized commonly for effecting the slip control of the lock-up clutch 42 and the pressure control for raising the second line pressure Pl2. Accordingly, the hydraulic circuit is simplified, making the present hydraulic control apparatus small-sized and lightweight. Further, it is unnecessary to adjust timing for controlling the tension of the belt, upon engagement of the lock-up clutch 42.

Further, in the instant embodiment, when the lock-up clutch control valve 416 is placed in the position for releasing the lock-up clutch 42, this valve 416 prevents the feedback pressure (i.e., THROTTLE pressure Pth) from being applied to the chamber 254 of the throttle sensing valve 228. As a result, the THROTTLE pressure Pth is increased to thereby permit the second pressure regulating valve 150 to increase the second line pressure Pl2, and permit the third pressure regulating valve 278 to increase the third line pressure P(3. Consequently, while the torque converter 12 performs the torque amplifying function with the lock-up clutch 42 released, the tension of the belt 70 (i.e., engaging force of the belt 70) is increased with the increase in the second line pressure Pl2, while the torque capacity of the FORWARD clutch 62 or REVERSE brake 64 of the reversing device 12 is increased with the increase in the third line pressure Pl3.

While the torque converter 12 performs the torque amplifying function as described above, the second linear solenoid valve 106 is actuated to temporarily increase the modified THROTTLE pressure $Pth^m$ to thereby increase the torque capacity of the CVT 16. Since the modified THROTTLE pressure $Pth^m$ is regulated based on the THROTTLE pressure Pth which is raised during the torque amplifying operation of the torque converter 12, the upper limit of the modified THROTTLE pressure $Pth^m$ is elevated, as shown in FIG. 10.

While the present invention has been described in its preferred embodiment, for illustrative purpose only, the invention may be otherwise embodied.

In the illustrated embodiment, the pilot pressure PsolL1 generated by the first linear solenoid valve 105 is applied to the chamber 392 of the slip control valve 390 and the chamber 190 of the second pressure regulating valve 150, through the ports 452, 466 of the lock-up clutch control valve 416. This is because the pilot pressure PsolL1 is used for other purposes, such as the back pressure control operation for the accumulators 320, 322, when the lock-up clutch 42 is released. Therefore, if the pilot pressure PsolL1 is used only for controlling the slipping of the lock-up clutch 42 and raising the belt tensioning pressure, the pilot pressure PsolL1 generated by the first linear solenoid valve 105 may be applied directly to the chamber 392 of the slip control valve 390 and the chamber 190 of the second pressure regulating valve 150.

In the illustrated embodiment, the second line pressure Pl2 regulated by the second pressure regulating valve 150 is applied to the CVT 16, through the shift control valve assembly 330. However, the hydraulic control circuit may be adapted such that the pressure Pl2 is directly applied to the second hydraulic cylinder 82 of the CVT 16.

While the power transmitting system of the illustrated embodiment is constructed such that the reversing device 14 is provided between the torque converter 12 and the CVT 16, the reversing device 14 may be provided between the CVT 16 and the reduction gear device 18.

It is to be understood that the present invention may be embodied with various other changes, modifications and improvements, which may occur to those skilled in the art, without departing from the scope of the invention defined in the following claims.

What is claimed is:

1. A hydraulic control apparatus for controlling a power transmitting system of a motor vehicle, said hydraulic control apparatus including a hydraulically operated continuously variable transmission and a torque converter provided with a lock-up clutch, said transmission including a first and a second shaft, a pair of variable-diameter pulleys provided on said first and second shafts, respectively, a transmission belt connecting the pair of pulleys, and a pair of hydraulic actuators for changing effective diameters of said pulleys for continuously variably changing a speed ratio of the transmission, one of said pair of hydraulic actuators receiving a belt tensioning pressure for controlling a tension of said transmission belt, said torque converter having an engaging chamber which receives a first pressure for engaging said lock-up clutch, and a releasing chamber which receives a second pressure for releasing the lock-up clutch, said hydraulic control apparatus comprising:
   a lock-up clutch control valve which is placed in an engaging position and a releasing position for engaging and releasing said lock-up clutch, respectively, said lock-up clutch control valve controlling said first and second pressures to be applied to said engaging chamber and said releasing chamber, to selectively engage and release said lock-up clutch;
   a slip control valve for regulating a difference between said first and second pressures for a predetermined period of time after said lock-up clutch control valve is operated to said engaging position, so as to control an amount of slipping of said lock-up clutch until the clutch is fully engaged;
   pressure control means for raising said belt tensioning pressure so as to increase said tension of said transmission belt; and
   pilot-pressure generating means for applying a pilot pressure simultaneously to said slip control valve and said pressure control means for said predetermined period of time after said lock-up clutch control valve is operated to said engaging position, so that said belt tensioning pressure is raised while said slip control valve controls the amount of slipping of said lock-up clutch.

2. A hydraulic control apparatus according to claim 1, wherein said first pressure is higher than said second pressure when said lock-up clutch control valve is placed in said engaging position, while said second pressure is higher than said first pressure when said lock-up clutch control valve is placed in said releasing position.

3. A hydraulic control apparatus according to claim 1, further comprising a solenoid-operated valve which is turned on and off to place said lock-up clutch control valve in said engaging and releasing positions, respectively, said solenoid-operated valve being actuated depending upon at least a current vehicle speed and a currently required output torque of said engine, said pilot-pressure generating means generating said pilot pressure when said solenoid-operated valve is turned on.

4. A hydraulic control apparatus according to claim 1, wherein said slip control valve receives from said lock-up clutch control valve a pressure of a fluid which is discharged from said releasing chamber when said lock-up clutch control valve is placed in said releasing position so as to regulate said second pressure of said releasing chamber.

5. A hydraulic control apparatus according to claim 1, wherein said pressure control means comprises a pressure regulating valve for regulating said belt tensioning pressure, said pressure regulating valve having a chamber which receives said pilot pressure from said pilot-pressure generating valve and a valve spool which is biased by said pilot pressure toward a position for raising said belt tensioning pressure.

6. A hydraulic control apparatus according to claim 1, wherein said pilot-pressure generating means comprises a solenoid-operated valve having a linear solenoid coil which is energized in response to an electric signal such that said pilot pressure is continuously increased with an increase in the magnitude of said electric signal.

7. A hydraulic control apparatus according to claim 1, wherein said predetermined period of time is between a point at which said lock-up clutch control valve is operated to said engaging position and a point at which said lock-up clutch is fully engaged.

8. A hydraulic control apparatus according to claim 1, wherein said pilot pressure is applied to said slip control valve and said pressure control means through said lock-up clutch control valve.

9. A hydraulic control apparatus according to claim 1, further comprising an electronic control device for actuating said pilot-pressure generating means to generate said pilot pressure during said predetermined period of time after said lock-up clutch is operated to said engaging position.

* * * * *